United States Patent
Albers et al.

(10) Patent No.: US 12,344,529 B2
(45) Date of Patent: *Jul. 1, 2025

(54) BIOLOGICAL INKS AND COATINGS AND ASSOCIATED METHODS

(71) Applicant: Living Ink Technologies, LLC, Fort Collins, CO (US)

(72) Inventors: Stevan Albers, Fort Collins, CO (US); Scott Fulbright, Denver, CO (US)

(73) Assignee: Living Ink Technologies, LLC, Berthoud, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,013

(22) Filed: Dec. 14, 2022

(65) Prior Publication Data

US 2023/0123566 A1 Apr. 20, 2023

Related U.S. Application Data

(63) Continuation of application No. 16/677,644, filed on Nov. 7, 2019, now Pat. No. 11,577,962.

(60) Provisional application No. 62/756,968, filed on Nov. 7, 2018.

(51) Int. Cl.
*C09C 1/48* (2006.01)
*C01B 32/318* (2017.01)
*C09C 1/54* (2006.01)
*C09C 1/60* (2006.01)
*C09C 1/62* (2006.01)

(52) U.S. Cl.
CPC ............... *C01B 32/318* (2017.08); *C09C 1/48* (2013.01); *C09C 1/54* (2013.01); *C09C 1/60* (2013.01); *C09C 1/622* (2013.01); *C01P 2004/61* (2013.01); *C01P 2004/62* (2013.01); *C01P 2004/64* (2013.01)

(58) Field of Classification Search
CPC ................... C09C 1/48; C01B 32/05
See application file for complete search history.

(56) References Cited

U.S. PATENT DOCUMENTS

| | | | |
|---|---|---|---|
| 8,722,571 B2* | 5/2014 | Bandosz | B01J 20/28061 502/430 |
| 9,718,689 B2 | 8/2017 | Miller et al. | |
| 9,758,757 B2 | 9/2017 | Harlin et al. | |
| 10,336,982 B2 | 7/2019 | Takeuchi et al. | |
| 11,577,962 B2* | 2/2023 | Albers | C01B 32/318 |
| 2011/0056124 A1* | 3/2011 | Heilmann | C10L 5/44 44/605 |
| 2011/0158893 A1 | 6/2011 | Haik | |
| 2013/0144087 A1* | 6/2013 | Arora | C07C 29/1518 252/373 |
| 2013/0236937 A1* | 9/2013 | Harlin | C12P 7/6445 502/402 |
| 2014/0373752 A2 | 12/2014 | Hassinen et al. | |
| 2017/0058127 A1 | 3/2017 | Naduvile Veettil | |
| 2017/0073623 A9 | 3/2017 | Kodukula et al. | |
| 2018/0134899 A1 | 5/2018 | Mulqueen | |
| 2019/0225931 A1 | 7/2019 | Dimitrelos | |

FOREIGN PATENT DOCUMENTS

| | | |
|---|---|---|
| CN | 104743354 A | 7/2015 |
| CN | 108766773 A | 11/2018 |
| JP | 2008285632 | 11/2008 |
| WO | 9204414 | 3/1992 |
| WO | 2012110697 A2 | 8/2012 |
| WO | 2019171177 A1 | 9/2019 |

* cited by examiner

*Primary Examiner* — Stuart L Hendrickson
(74) *Attorney, Agent, or Firm* — Dentons Davis Brown; Matthew Coryell

(57) ABSTRACT

The disclosed method and related systems and devices relate to producing a pigment from microbial biomass. The pigment may be an engineered black pigment. The method may include a thermal processing step where the microbial biomass is charred. The biomass in the charred and pre-charred state can be washed chemically and/or mechanically. In another step the biomass is ground via a grinding of milling process. The grinding/milling may occur at any various points in the process. In some embodiments the biomass has a particle size between 0.01 and 100 microns.

18 Claims, 27 Drawing Sheets

Refer to experiment "BASELINE TESTS" for more specifics regarding the below images
Decolored Spirulina - Baseline TGA
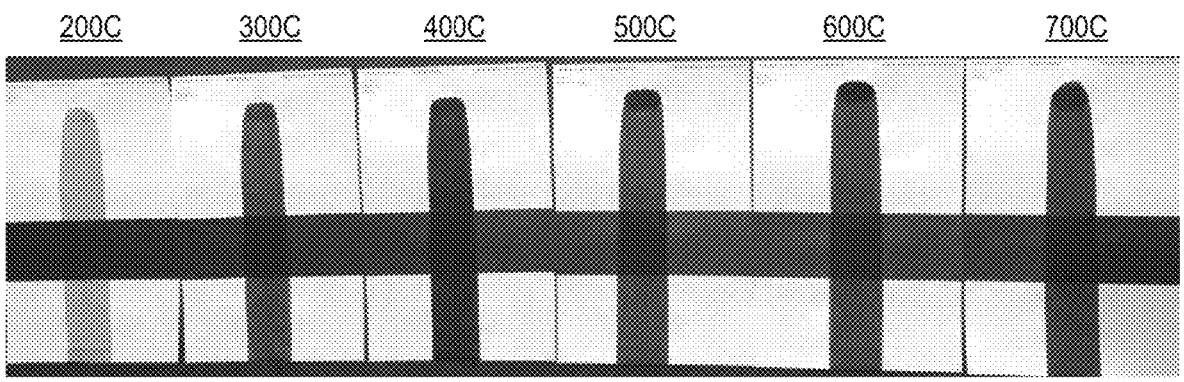
Decolored Spirulina - Baseline TGA - acid washed before making pigment dispersion
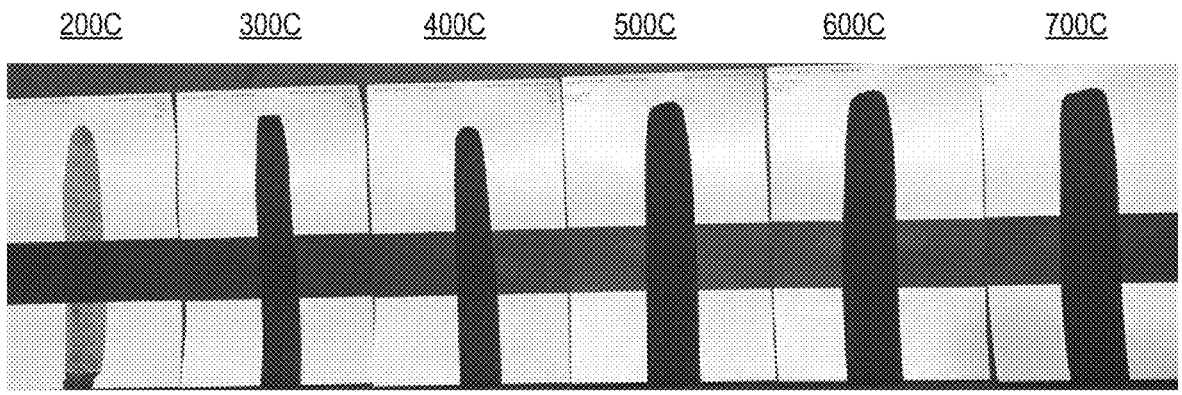
FIG. 7

Refer to experiment "BASELINE RERUN" for more specifics regarding the below images
Defatted Nannochloropsis - Baseline rerun
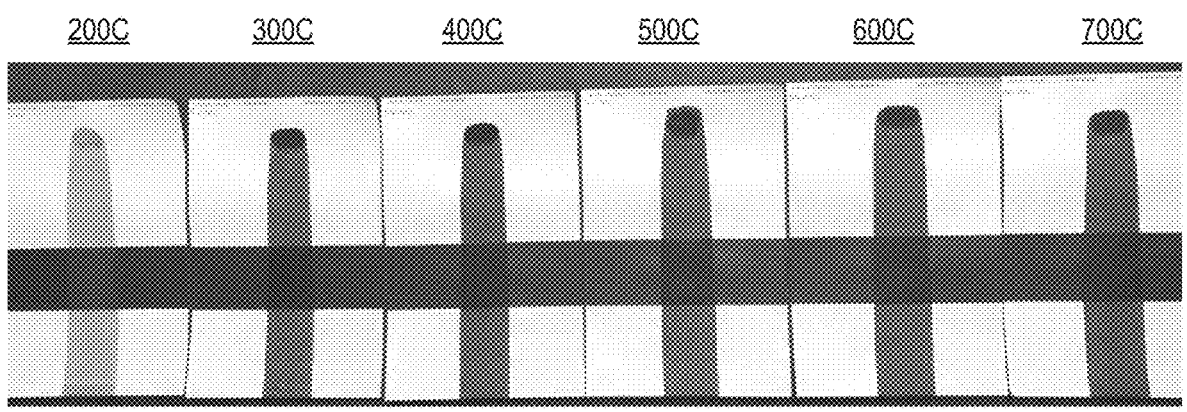
Defatted Nannochloropsis - Baseline rerun - Acid washed before making pigment dispersion
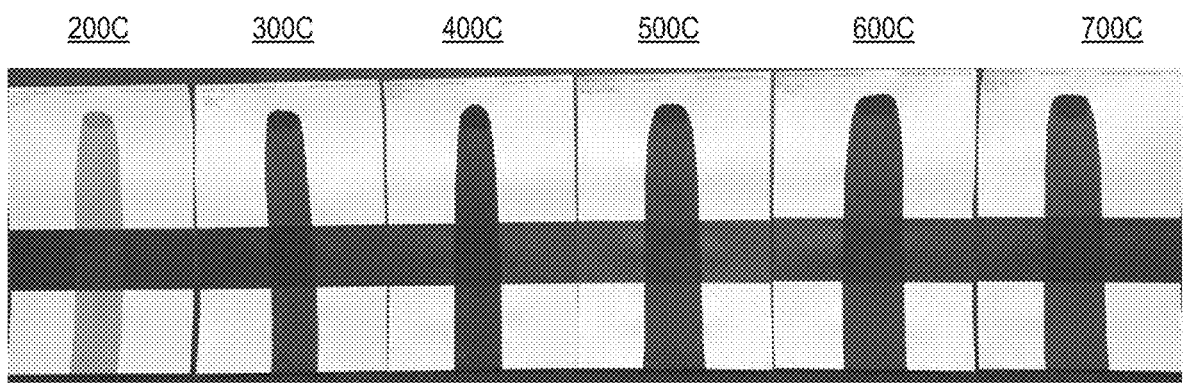
FIG. 9

Refer to experiment "BASELINE RERUN" for more specifics regarding the below images Qualitas Defatted no DE SIEVED PRECHAR Sticks to spatula Qualitas Defatted no DE 200C TGA Sticks to spatula Qualitas Defatted no DE 300C TGA Sticks to spatula Qualitas Defatted no DE 400C TGA Not sticky Qualitas Defatted no DE 500C TGA Not sticky Qualitas Defatted no DE 600C TGA Not sticky Qualitas Defatted no DE 700C TGA Not sticky

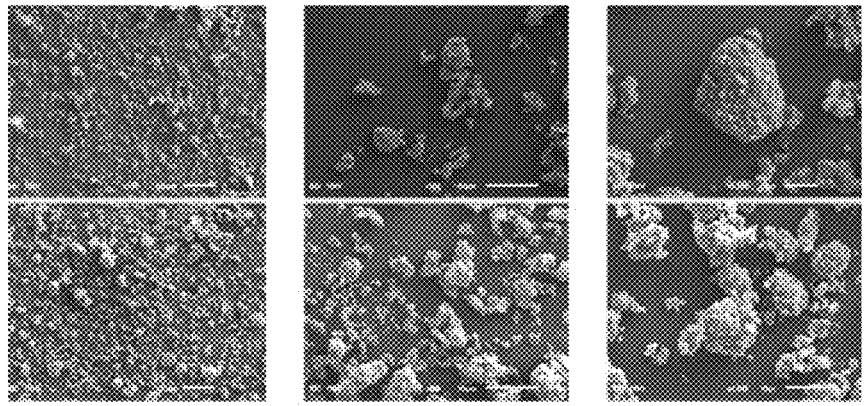
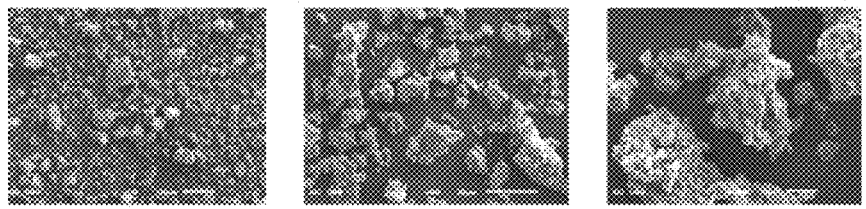

FIG. 10

Refer to experiment "SPECIES DIFFERENCE/RESIDUAL BIOMASS" for more specifics regarding the below images
Commercial biochar - unwashed
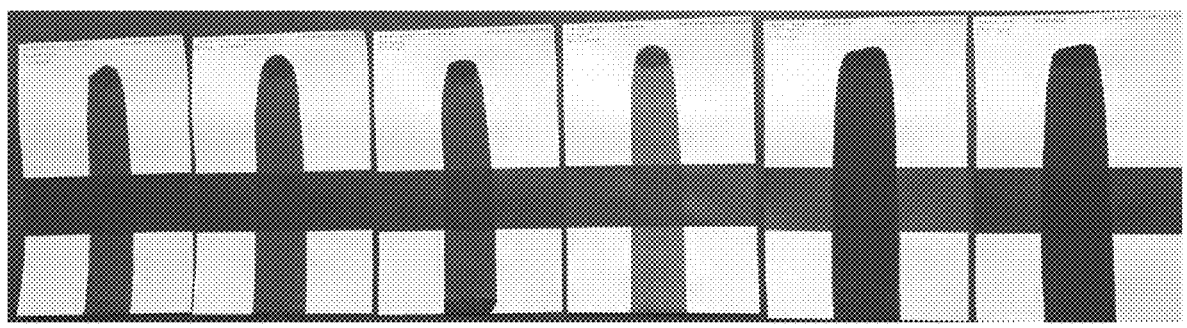
Commercial biochar - acid unwashed
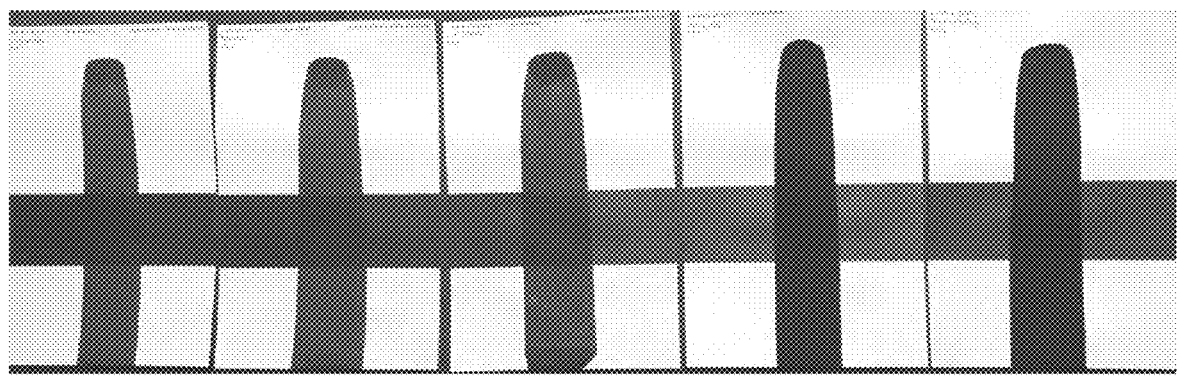
FIG. 12

Refer to experiment "SPECIES DIFFERENCE/RESIDUAL BIOMASS" for more specifics regarding the below images
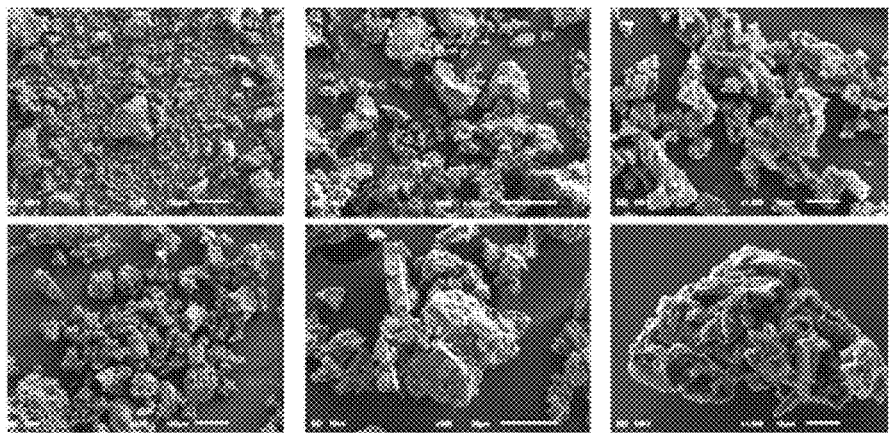
Cool Planet Unwashed Herb grinder 5 min
SEEK Bamboo Unwashed Herb grinder 4 min
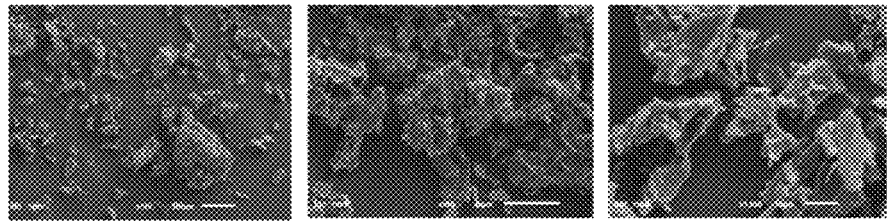
Wakefield Biochar Unwashed Mortar pestle 2 min
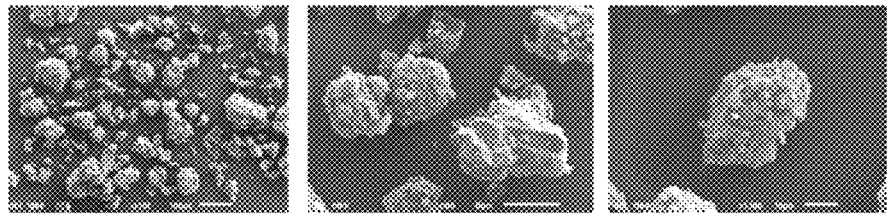
Wakefield Biochar Post acid wash
Biochar Now Unwashed
Biochar Now Post acid wash
FIG. 13

Refer to experiment "SPECIES DIFFERENCE/RESIDUAL BIOMASS" for more specifics regarding the below images
Species difference - at 200C
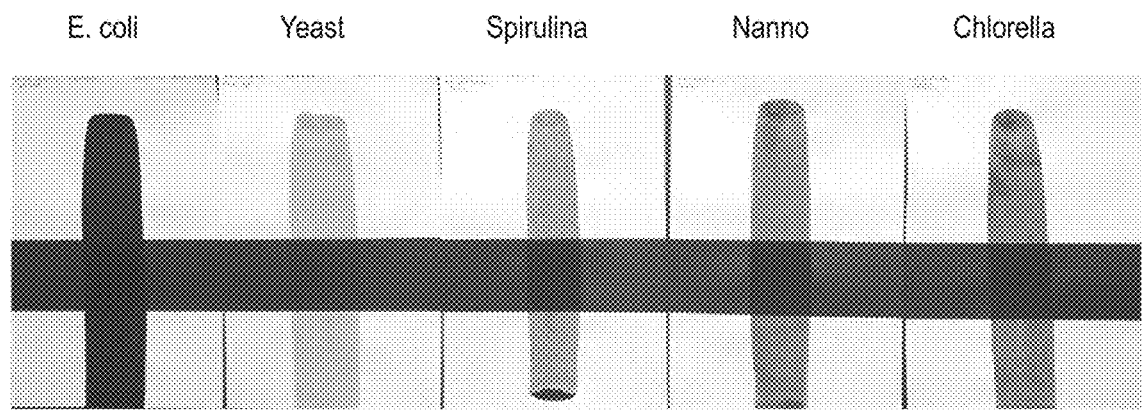
Species difference - at 500C
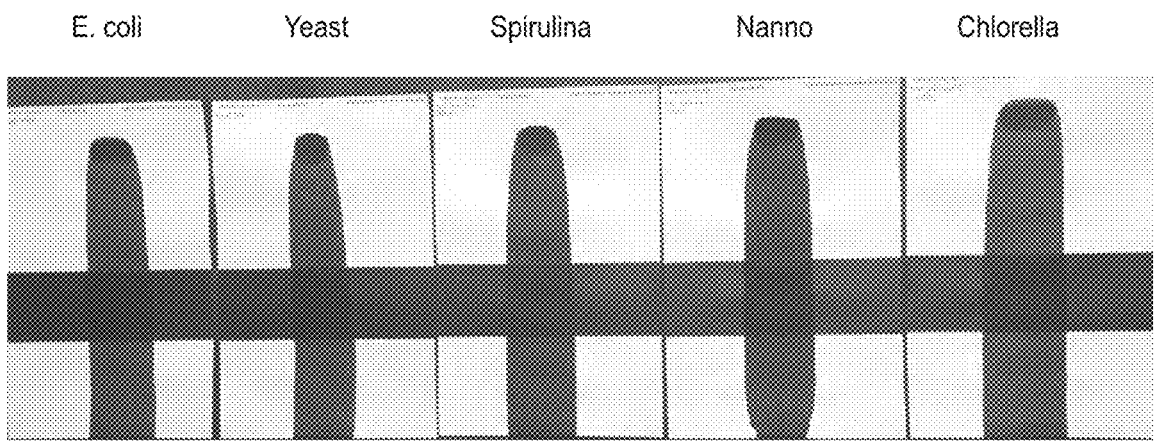
FIG. 14

Refer to experiment "SPECIES DIFFERENCE/RESIDUAL BIOMASS" for more specifics regarding the below images Refer to experiment "SPECIES DIFFERENCE/RESIDUAL BIOMASS" for more specifics regarding the below images
E.coli
E.coli Prechar
E.coli 200C
E.coli 500C
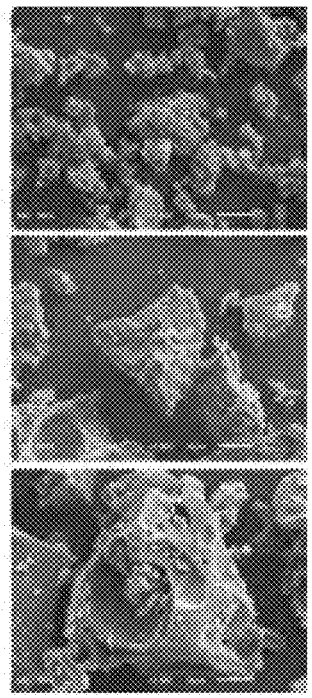
Yeast
Yeast Prechar
Yeast 200C
Yeast 500C
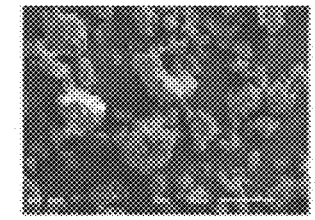
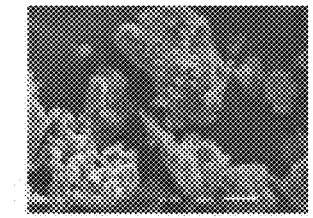
FIG. 16

Refer to experiment "SPECIES DIFFERENCE/RESIDUAL BIOMASS" for more specifics regarding the below images
Nannochloropsis
WC Nanno Prechar
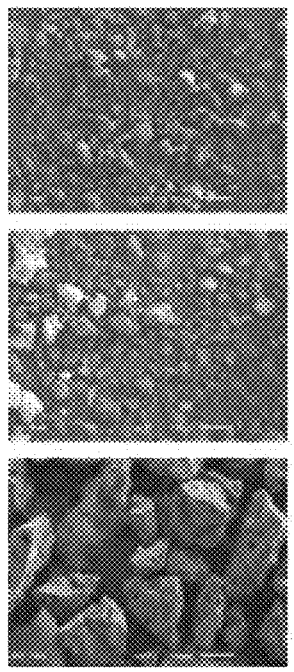
WC Nanno 200C
WC Nanno 500C
Chlorella
WC Chlorella Prechar
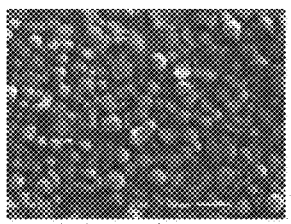
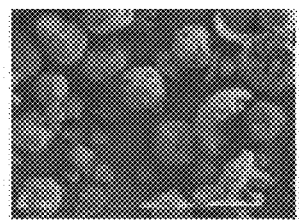
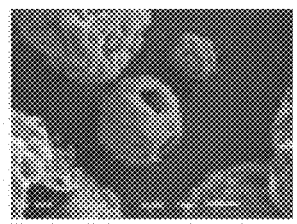
WC Chlorella 300C
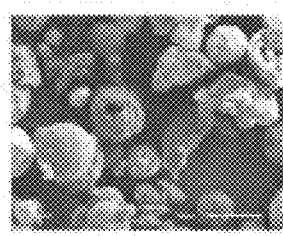
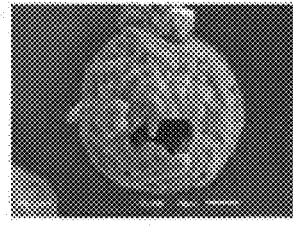
WC Chlorella 500C
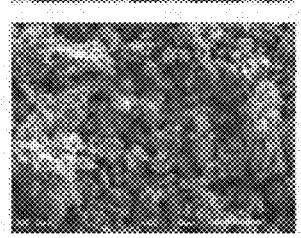
FIG. 17

Refer to experiment "SPECIES DIFFERENCE/RESIDUAL BIOMASS" for more specifics regarding the below images
Spirulina
WC Spirulina Prechar
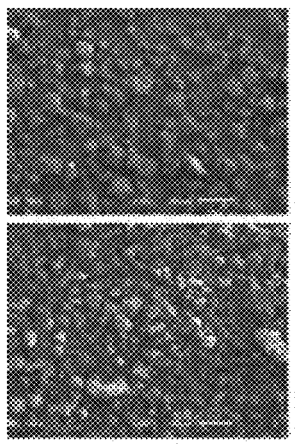
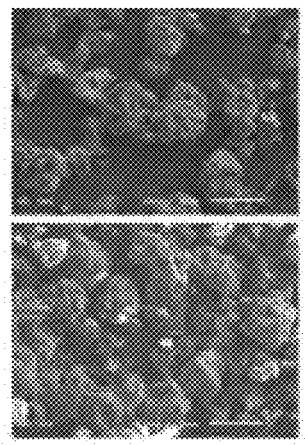
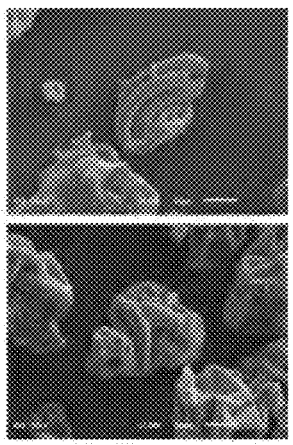
WC Spirulina 200C
WC Spirulina 500C
Pine saw dust
Pine dust Prechar
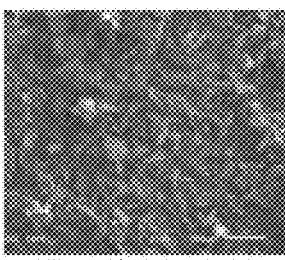
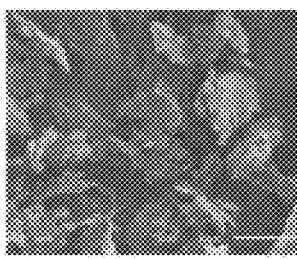
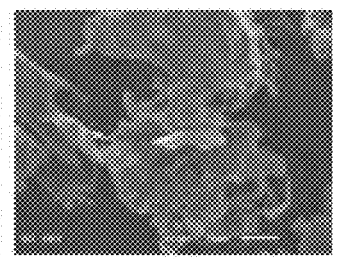
Pine dust 200C
Pine dust 500C
FIG. 18

Refer to experiment "SPECIES DIFFERENCE/RESIDUAL BIOMASS" for more specifics regarding the below images
Residual biomass - nanno at 200C
WC nanno    Q. Defat    Q. Defat deprot
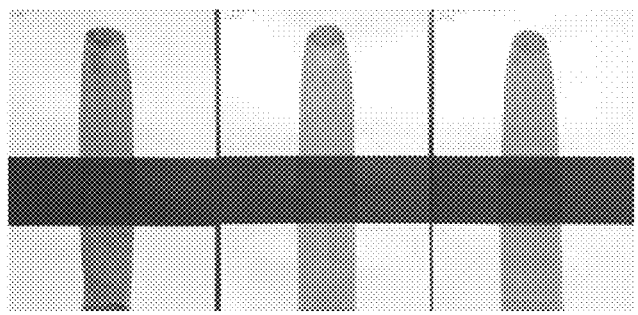
Residual biomass - nanno at 500C
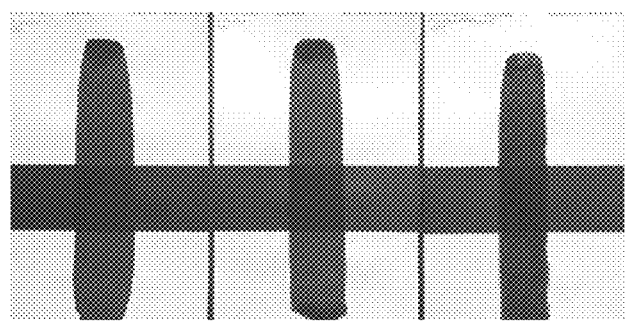
Residual biomass - nanno at 200C
WC nanno    Prewash water    Prewash acid    Prewash acid+water
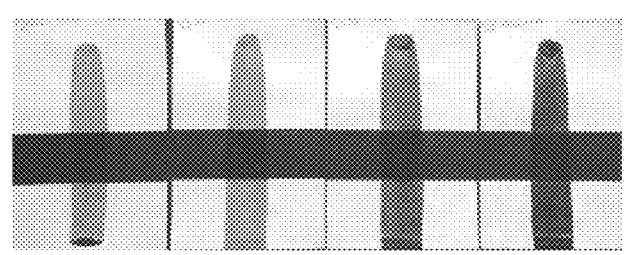
Residual biomass - Spirulina at 500C
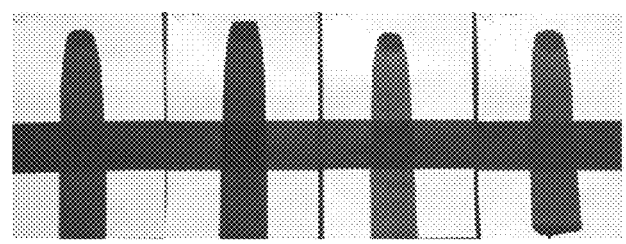
FIG. 19

Refer to experiment "SPECIES DIFFERENCE/RESIDUAL BIOMASS" for more specifics regarding the below images
Qualitas defatted no De Prechar
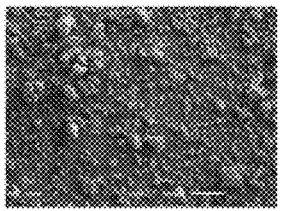 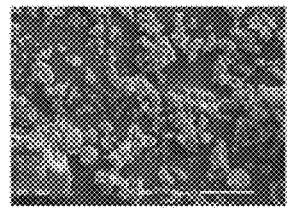 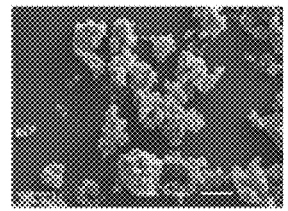
Qualitas defatted no De 200C
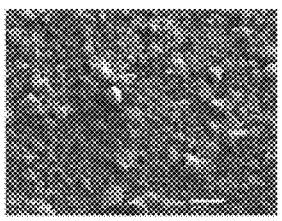  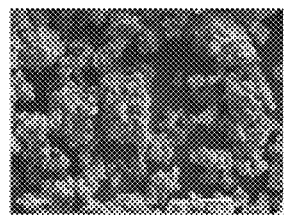
Qualitas defatted no De 500C
  
Qualitas defatted deproteinated Prechar
 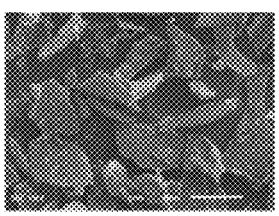 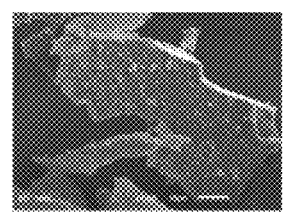
Qualitas defatted deproteinated 200C
  
Qualitas defatted deproteinated 500C
 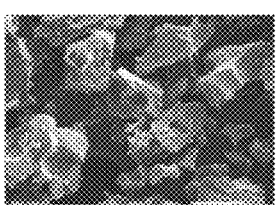 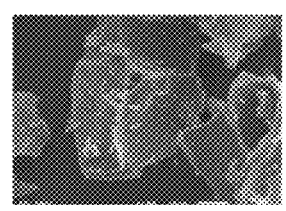
FIG. 20

Refer to experiment "PRE WASH" for more specifics regarding the below images
Decolored Spirulina Prewash water
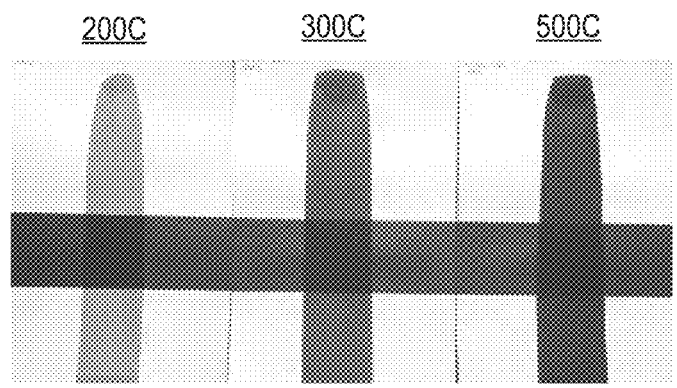
Decolored Spirulina Prewash acid
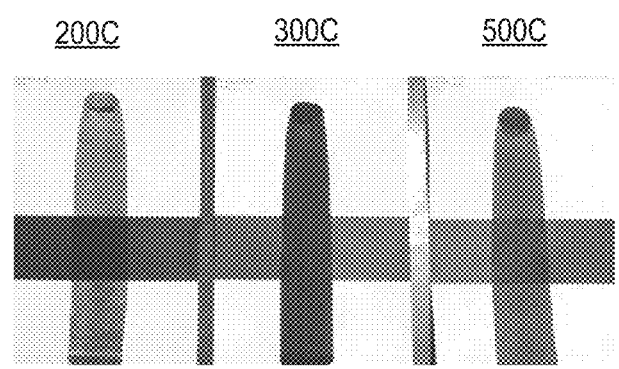
Decolored Spirulina Prewash acid + water
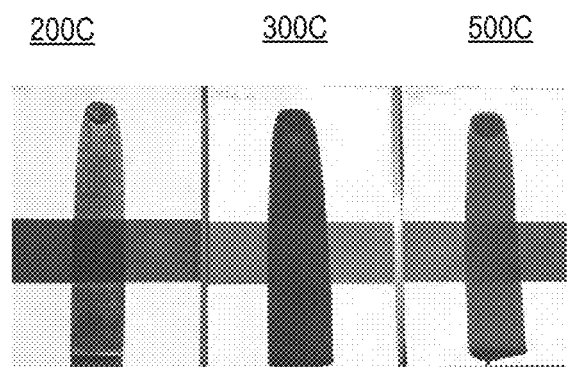
FIG. 21

Refer to experiment "PRE WASH" for more specifics regarding the below images
Decolored Spirulina
Prewash water 500C    Prewash acid + water 500C    Pre acid 500 + post acid wash
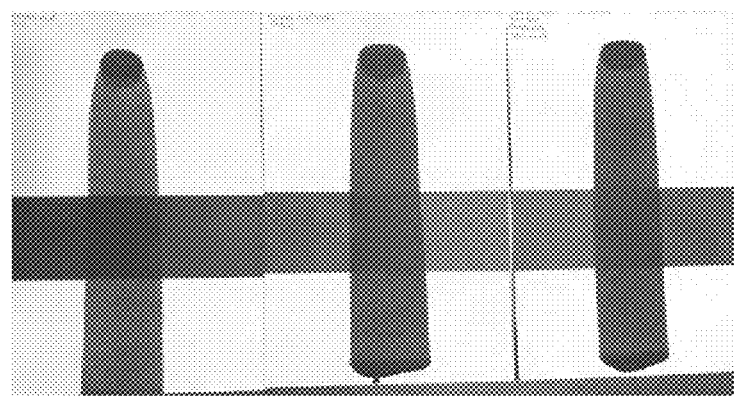
Prewash water 500C    Pre water 500 + post acid wash
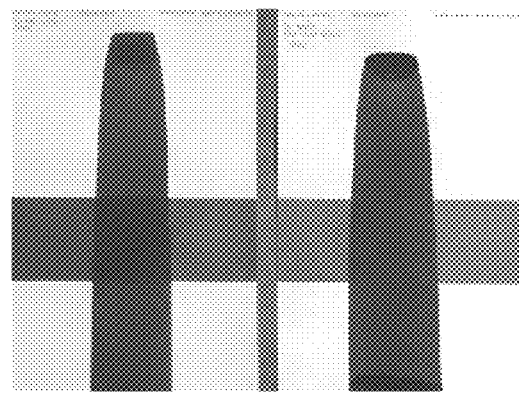
FIG. 22

Refer to experiment "PRE WASH" for more specifics regarding the below images
Decolored Spirulina
Prewash acid + water prechar LINA-X
Prewash Lina-X acid + water 200C TGA
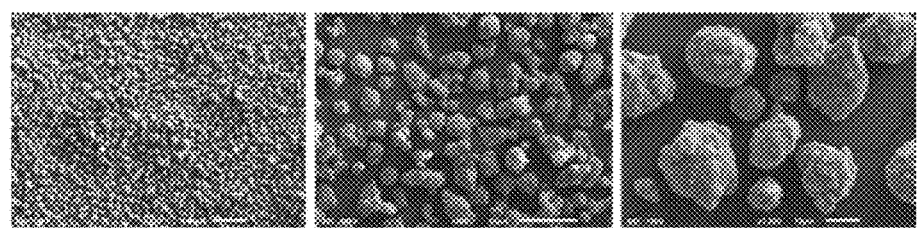
Prewash Lina-X acid + water 300C TGA
Prewash water Post TGA 500C LINA-X
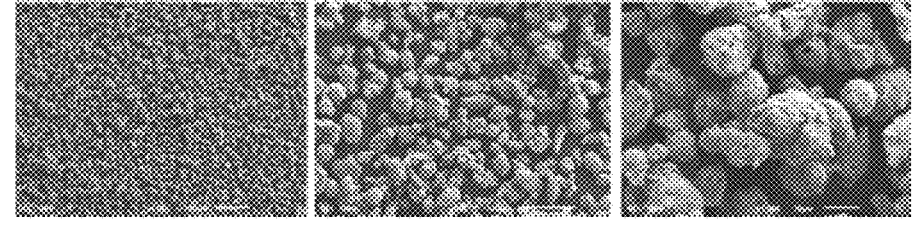
FIG. 24

Refer to experiment "PRE WASH" for more specifics regarding the below images
Decolored Spirulina
Prewash acid prechar LINA-X
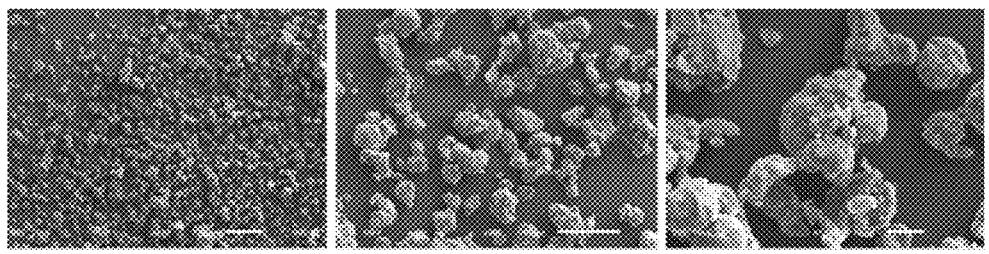
Prewash Lina-X acid 200C TGA
Prewash Lina-X acid 300C TGA
Prewash Acid Post TGA 500C LINA-X Ground
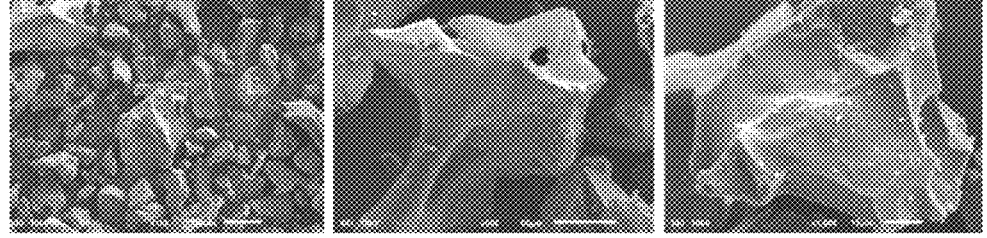
FIG. 25

Refer to experiment "PRE WASH" for more specifics regarding the below images
Decolored Spirulina
Prewash acid + water prechar LINA-X
Prewash Lina-X acid + water 200C TGA
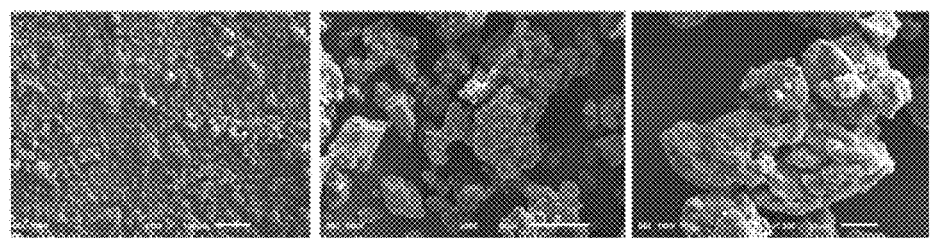
Prewash Lina-X acid + water 300C TGA
Prewash acid + water post TGA 500XC LINA-X Ground
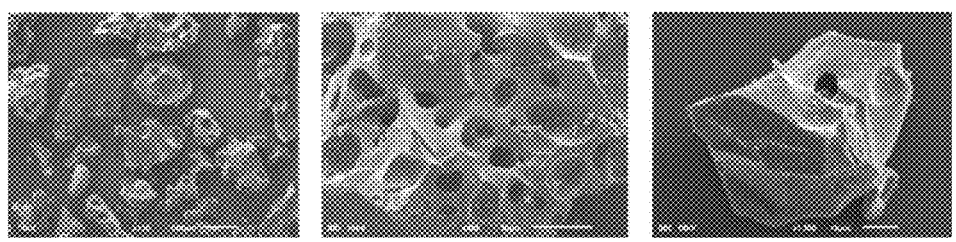
FIG. 26

BIOLOGICAL INKS AND COATINGS AND ASSOCIATED METHODS

CROSS-REFERENCE TO RELATED APPLICATION(S)

This is a continuation application of U.S. application Ser. No. 16/677,644, filed Nov. 7, 2019, and entitled "BIOLOGICAL INKS AND COATINGS AND ASSOCIATED METHODS," which claims priority to U.S. Provisional Application No. 62/756,968 filed Nov. 7, 2018 and entitled "BIOLOGICAL INKS AND COATINGS AND ASSOCIATED METHODS, SYSTEMS AND DEVICES," which are hereby incorporated by reference in its entirety under 35 U.S.C. § 119 (e).

TECHNICAL FIELD

The disclosed technology relates generally to the production of pigments and colorants from microbial biomass.

BACKGROUND

Pigments and colorants represent an over $30 billion a year industry. Yet the production of these compositions is associated with the production of toxic bioproducts that can harm human health and the environment. Prior attempts to generate pigment from non-toxic biomass have been limited in their ability to produce sufficiently small particle size to be suitable for most industrial applications. Thus, there is a need in the art for a method to produce pigments/colorants from sustainable sources that are suitable for industrial needs.

BRIEF SUMMARY

Disclosed is a method for producing an engineered carbon black pigment from a microbial biomass by performing thermal processing of the microbial biomass to form a charred biomass; washing the charred biomass; and grinding the charred biomass to a particle size of between about 0.01 microns and about 100 microns to form a milled microbechar. In certain aspects, the microbial biomass is comprised of a plurality of prokaryotic cells. In exemplary aspects, the plurality of prokaryotic cells has an average size of below 20 μm. According to certain implementations, the microbial biomass is comprised of decolorized prokaryotic cells. In exemplary embodiments, the decolorized prokaryotic cells are Arthrospira.

In certain embodiments, the method further includes the step of washing the microbial biomass prior to the thermal processing step. In implementations, the wash step is in water. In further implementations, the wash is an acid wash e.g., the microbial biomass is incubated in a solution with an acidic pH, such as 1.5. In exemplary implementations, the acid wash may be followed by one or more water washes. In further implementations, the acid wash may be followed or replaced by a wash in a basic solution.

According to further aspects, the wash of the charred biomass is an acid wash. In exemplary embodiments, the acid wash comprises immersing the charred biomass in a solution with a pH stabilized below about 2. In exemplary embodiments of these implementations, the charred biomass at reduced pH for a time interval from about 1 minute to about 1 hour. In further implementations, following the acid wash is a step of washing the charred biomass in water following the acid wash. In exemplary aspects, of these implementations, the acid wash and subsequent water wash produces a porous microbiochar.

According to certain aspects, the grinding step is performed by way of an apparatus selected from the group consisting of a ball/media mill, long gap mill, air classification, jet mill, three roll mill, basket mill, cryo mill and cyclone mill. In certain implementations, the grinding step is performed without the use of a: jaw crusher, hammer mill, saw mill, impact dryer mill, granulator, guillotine, impact dryer mill, lump breaker, knife mill, pin mill, roller crusher, rotary mill, vibratory tumbler, or magnetic tumbler, thus decreasing cost and complexity of the process. In certain alternative embodiments, the grinding step is performed by way of a method selected from the group consisting of ammonia freeze explosion, steam hydrolysis, and wet-oxidation.

In exemplary embodiments, the grinding step is performed until the average particle size diameter of the milled microbechar is less than about 10 microns.

Further disclosed herein is an engineered carbon black pigment comprising a charred biomass derived from a microbial biomass with a particle size of between about 0.01 microns and about 100 microns.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

BRIEF DESCRIPTION OF THE DRAWINGS

FIG. 7 depicts pigment from decolored *spirulina* baseline TGA subject to thermal processing at different temperatures and pigment from decolored *spirulina* baseline TGA subject to thermal processing at different temperatures that was acid washed prior to making the pigment dispersion.

FIG. 9 depicts defatted *nannochloropsis* pigments at subject to thermal processing at different temperatures and defatted *nannochloropsis* pigments at subject to thermal processing at different temperatures that was acid washed before prior to making the pigment dispersion.

FIG. 10 shows magnified images of defatted Nannochlorposis including: sieved, prechar, defatted Qualitas; defatted, 200° C. TGA Qualitas, defatted, 300° C. TGA Qualitas;

defatted, 400° C. TGA Qualitas; defatted, 500° C. TGA Qualitas; defatted, 600° C. TGA Qualitas; and defatted, 700° C. TGA Qualitas.

Figure 11:
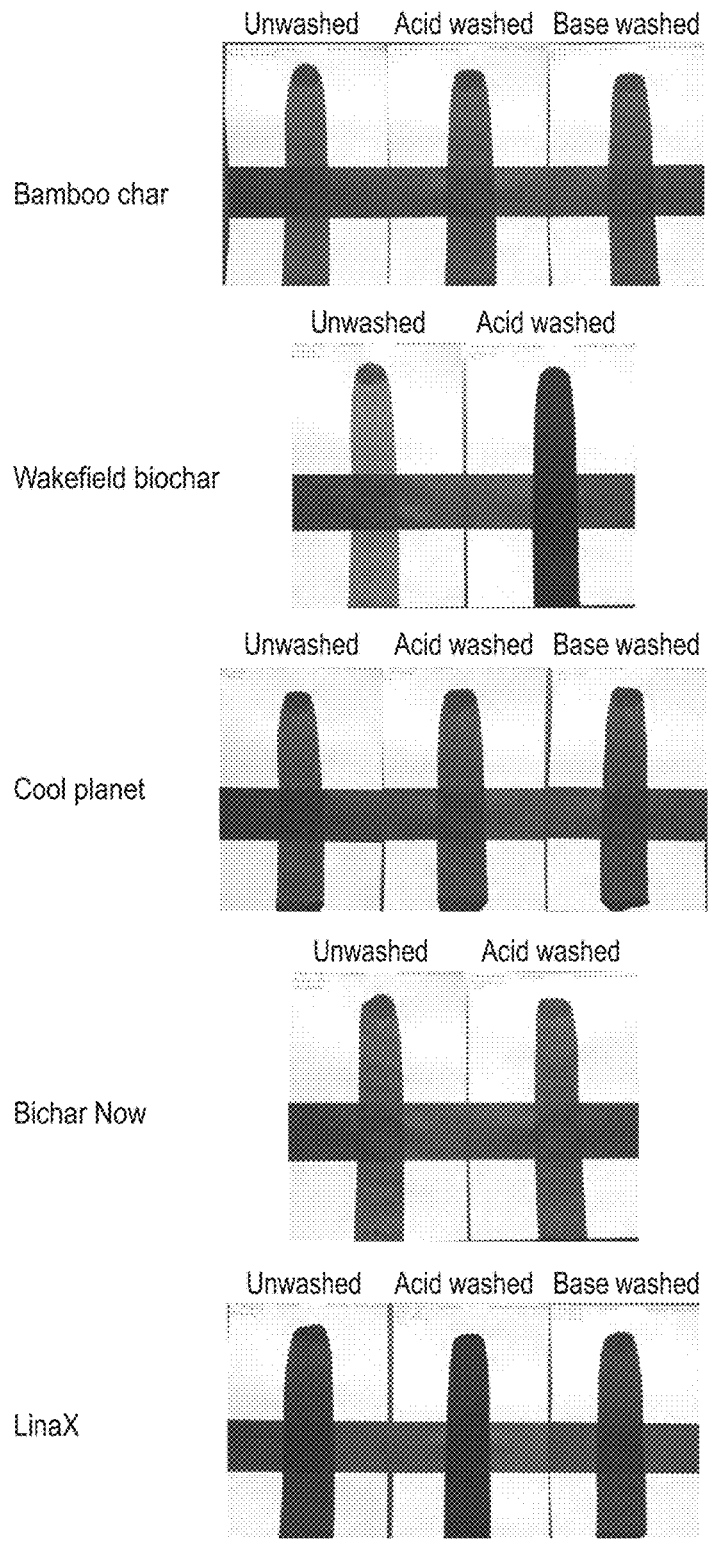

FIG. 11 show images of unwashed, acid washed and base washed pigments from Bamboo char, Wakefield biochar, Cool planet, Biochar Now, and LinaX.

FIG. 12 shows images of pigment from unwashed commercial biochar and acid washed commercial biochar of Biochar Now, bamboo, Cool planet, Wakefield, LinaX.

FIG. 13 shows magnified images of: unwashed Cool Plant ground with herb grinder for 5 minutes; unwashed SEEK Bamboo ground with herb grinder for 4 minutes; unwashed Wakefield Biochar ground with mortar pestle for 2 minutes; acid washed Wakefield Biochar; unwashed Biochar Now; and acid washed Biochar Now.

FIG. 14 shows pigments from *E. Coli*, Yeast, *Spirulina*, *Nannochloropsis*, and *Chlorella* after treatment at 200° C. and 500° C.

Figure 15:
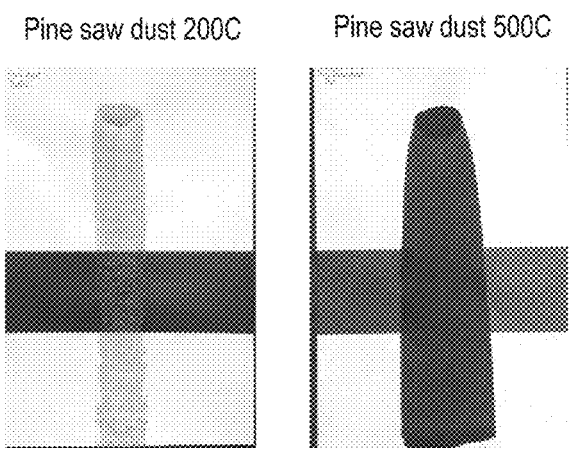

FIG. 15 shows pigments form pine saw dust after treatment at 200° C. and 500° C.

FIG. 16 shows magnified images of *E. Coli* prechar, after treatment at 200° C., and after treatment at 500° C. and magnified images of Yeast prechar, after treatment at 200° C. and after treatment at 500° C.

FIG. 17 shows magnified images of *Nannochloropsis* prechar, after treatment at 200° C., and after treatment at 500° C. and magnified images of *Chlorella* prechar, after treatment at 200° C. and after treatment at 500° C.

FIG. 18 shows magnified images of *Spirulina* prechar, after treatment at 200° C., and after treatment at 500° C. and magnified images of Pine saw dust prechar, after treatment at 200° C. and after treatment at 500° C.

FIG. 19 shows pigments from the residual biomass of *Nannochloropsis* treated at 200° C. for WC nanno, defatted Qualitas, and defatted Qualitas deprot; the residual biomass of *Nannochloropsis* treated at 500° C. for WC *Nannochloropsis*, Defatted Qualitas, and defatted Qualitas deprot; the residual biomass of *Spirulina* treated at 200° C. for WC *Spirulina*, prewashed with water, prewashed with acid and prewashed with acid and water; the residual biomass of *Spirulina* treated at 500° C. for WC *Spirulina*, prewashed with water, prewashed with acid and prewashed with acid and water.

FIG. 20 shows magnified images of: prechar, defatted Qualitas; 200° C., defatted Qualitas; 500° C., defatted Qualitas; prechar, deproteinated Qualitas; 200° C., deproteinated Qualitas; and 500° C., deproteinated Qualitas.

FIG. 21 shows images of pigments from decolored *Spirulina* prewashed with water and treated at 200° C., 300° C., and 500° C.; decolored *Spirulina* prewashed with acid and treated at 200° C., 300° C., and 500° C.; and decolor *Spirulina* prewashed with acid and water and treated at 200° C., 300° C., and 500° C.

FIG. 22 shows images of pigments from decolored *Spirulina* prewashed with acid and treated at 500° C.; prewashed with acid and water and treated at 500° C.; prewashed with acid, treated at 500° C. and post-washed with acid; prewashed with water and treated at 500° C.; and prewashed with water, treated at 500° C. and post-washed with acid.

Figure 23:
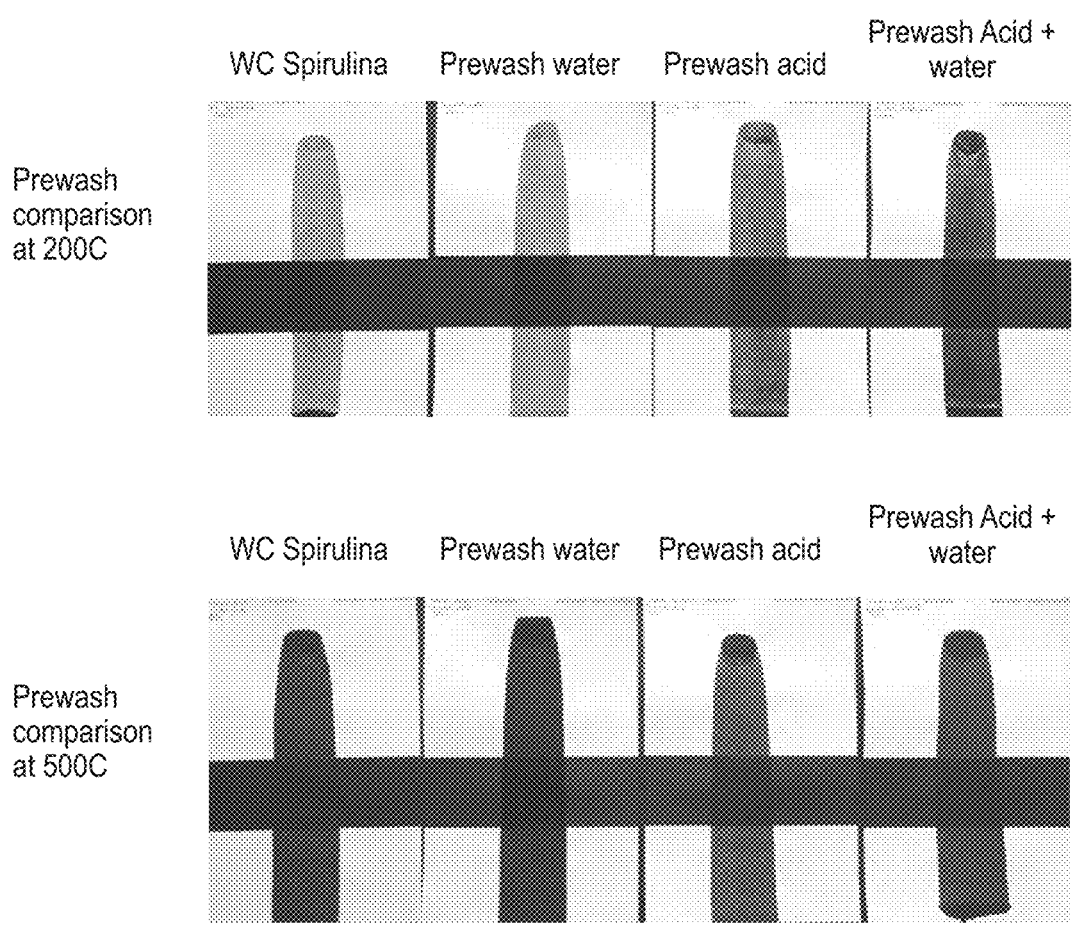

FIG. 23 shows images of pigments from WC *Spirulina*, *Spirulina* prewashed with water, *Spirulina* prewashed with acid, and *Spirulina* prewashed with acid and water treated at 200° C. and pigments from WC *Spirulina*, *Spirulina* prewashed with water, *Spirulina* prewashed with acid, and *Spirulina* prewashed with acid and water and treated at 500° C.

FIG. 24 shows magnified images of decolored *Spirulina*: LinaX prechar, prewashed with water; LinaX prewashed with water, and 200° C. TGA; LinaX prewashed with water, and 300° C. TGA; and LinaX prewashed with water, and 500° C. TGA.

FIG. 25 shows magnified images of decolored *Spirulina*: LinaX prechar, prewashed with acid; LinaX prewashed with acid, and 200° C. TGA; LinaX prewashed with acid, and 300° C. TGA; and LinaX prewashed with acid, ground, and 500° C. TGA.

FIG. 26 shows magnified images of decolored *Spirulina*: LinaX prechar, prewashed with water and acid; LinaX prewashed with water and acid, and 200° C. TGA; LinaX prewashed with water and acid, and 300° C. TGA; and LinaX prewashed with water and acid, ground, and 500° C. TGA.

Figure 27:
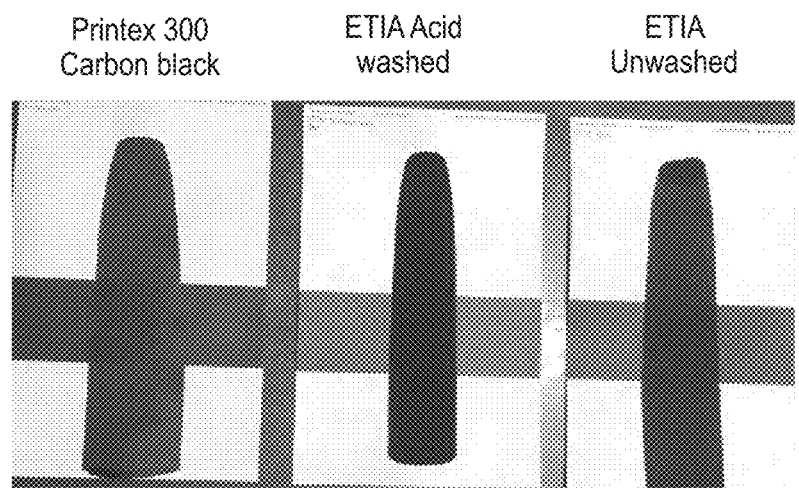

FIG. 27 shows pigment from Printex 300 Carbon Black, acid washed ETIA, and unwashed ETIA.

Figure 28:
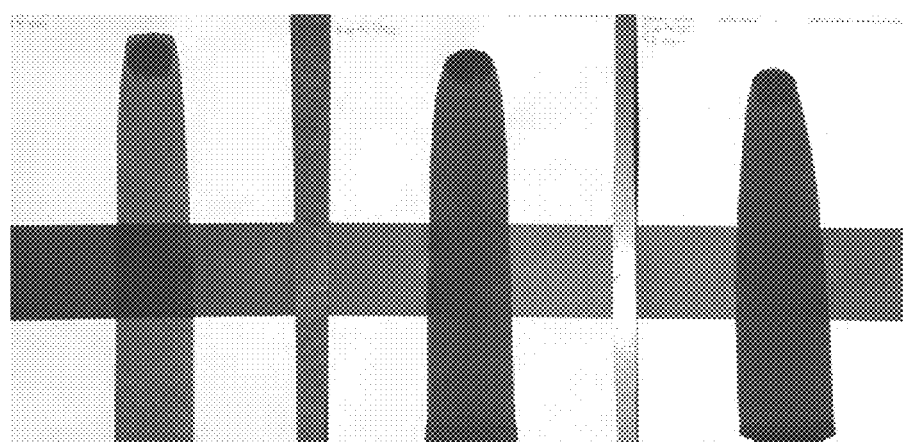

FIG. 28 shows pigment unwashed (12 μm), acid washed (10 μm) and, acid washed 7.5-5 μm) from Q. Defatted after 500° C. treatment.

DETAILED DESCRIPTION

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

Disclosed is a method for producing an engineered carbon black pigment from a microbial biomass by performing thermal processing of the microbial biomass to form a charred biomass; washing the charred biomass; and grinding the charred biomass to a particle size of between about 0.01 microns and about 100 microns to form a milled microbechar. In certain aspects, the microbial biomass is comprised of a plurality of prokaryotic cells. In exemplary aspects, the plurality of prokaryotic cells has an average size of below 20 µm. According to certain implementations, the microbial biomass is comprised of decolorized prokaryotic cells. In exemplary embodiments, the decolorized prokaryotic cells are Arthrospira.

In certain embodiments, the method further includes the step of washing the microbial biomass prior to the thermal processing step. In implementations, the wash step is in water. In further implementations, the wash is an acid wash e.g., the microbial biomass is incubated in a solution with an acidic pH, such as 1.5. In exemplary implementations, the acid wash may be followed by one or more water washes. In further implementations, the acid wash may be followed or replaced by a wash in a basic solution.

In certain aspects, the microbial biomass is dried prior to the thermal processing step. In exemplary implementations, microbial biomass is dried at temperature of from about ambient temperature and about 300° C., prior to the thermal processing step. In certain embodiments, the thermal processing step is performed for a time interval from about 1 second to about 24 hours. In exemplary implementations, the time interval is from about 5 minutes to about 40 minutes. In further implementations, the time interval is about 10 minutes.

In certain implementations, the thermal processing step is performed until a predetermined endpoint is reached. In exemplary embodiments, the thermal processing steps is performed until the charred biomass is comprised of fixed carbon of from about 20% to about 75%. In further embodiments, the thermal processing step is performed until the level of proximate volatiles in the charred biomass is below about 25%. In yet further embodiments, the thermal processing step is performed until the concentration of oxygen in the charred biomass is below about 20%. In still further embodiments, the thermal processing step is performed until the concentration of oxygen is from below about 10%. In even further embodiments, the thermal processing step is performed until the concentration of ash in the charred biomass is below about 20%. According to further implementations, the endpoint of the thermal processing step is achieved when the charred biomass has a predetermined ratio of fixed carbon to oxygen. In exemplary implementations of these embodiments, the thermo processing endpoint is reached when the ultimate oxygen to ultimate carbon ratio of the charred biomass is below about 0.30 oxygen to carbon (e.g., 3 parts ultimate oxygen to 10 parts ultimate carbon).

According to further aspects, the wash of the charred biomass is an acid wash. In exemplary embodiments, the acid wash comprises immersing the charred biomass in a solution with a pH stabilized below about 2. In exemplary embodiments of these implementations, the charred biomass at reduced pH for a time interval from about 1 minute to about 1 hour. In further implementations, following the acid wash is a step of washing the charred biomass in water following the acid wash. In exemplary aspects, of these implementations, the acid wash and subsequent water wash produces a porous microbiochar.

According to certain aspects, the grinding step is performed by way of an apparatus selected from the group consisting of a ball/media mill, long gap mill, air classification, jet mill, three roll mill, basket mill, cryo mill and cyclone mill. In certain implementations, the grinding step is performed without the use of a: jaw crusher, hammer mill, saw mill, impact dryer mill, granulator, guillotine, impact dryer mill, lump breaker, knife mill, pin mill, roller crusher, rotary mill, vibratory tumbler, or magnetic tumbler, thus decreasing cost and complexity of the process. In certain alternative embodiments, the grinding step is performed by way of a method selected from the group consisting of ammonia freeze explosion, steam hydrolysis, and wet-oxidation.

In exemplary embodiments, the grinding step is performed until the average particle size diameter of the milled microbechar is less than about 10 microns.

The milled microbechar can be further processed or modified for various downstream applications according to the methods disclosed herein.

Microbial Biomass

The various embodiments disclosed or contemplated herein relate to the use of autotrophic and/or heterotrophic biomass, including plant cells, bacteria, and photosynthetic microbes as an ink, coating and/or colorant. Naturally derived, engineered and/or processed cells may be utilized to obtain certain pigmented/colored cells/cultures. Certain implementations relate to the use of partial or whole cells that act as a colorant replacement within ink and other formulations, such that no extraction of colored molecules from the cells is required.

In certain implementations, the microbial biomass is comprised of a plurality of prokaryotic cells. In exemplary aspects, the plurality of prokaryotic cells has an average single cell size of below 20 µm. According to certain implementations, the microbial biomass is comprised of decolorized prokaryotic cells. In exemplary embodiments, the decolorized prokaryotic cells are Arthrospira.

Various implementations utilize colony forming types of bacteria, algae and cyanobacteria. In various implementations, the formulations of ink have aggregate diameters of smaller than 100 microns. One aspect of the disclosure relates to implementations where the pigment portion is about 0.01-100 microns. It is understood that this size allows an increase in the amount of pigment particles to disperse to an acceptable density so that dark colors can be attained. In various implementations, the 0.01-100 microns size can be achieved in several ways. In certain implementations, the size can be achieved by growing an appropriately sized biological cell. In alternate implementations, the size can be achieved by grinding the cells or cell aggregates to the correct size (0.01-100 microns). In yet another implementation, both cells with 0.01-100 microns in diameter as well as grinding of aggregates may be used.

According to certain implementations, the microbial biomass is comprised of plurality of microbial cells. Microbial cells suitable for the disclosed method of microbes include heterotrophic, autotrophic, mixotrophic, or extremophillic microorganisms, including microalgae, algae, macro algae, cyanobacteria, fungi, and bacteria. In certain implementations, the plurality of cells are a mixture of the forgoing. According to certain embodiments, the microbes comprising the plurality of microbial cells is one or more selected from the following: *Synechocystis* PCC 6803, *Synechococcus* PCC 6717, *Synechococcus* PCC 6301, *Synechococcus* IU 625, *Synechococcus* PCC 6312 *Synechococcus elongatus* PCC 7942, *Nostoc* sp., *Synechococcus* 6911, *Synechococcus leopoliensis*, plankthorax *rubescens*, *Synechococcus* PCC 7002, Arthospira *platensis* PCC 7345, *Haematococcus* pluvailis, *Navicula pelliculosa*, Cryptomonas *erosa*, Rhodomonas *minuta*, Porphyridium *purpureum*, *Phaeodactylum tricornutum*, *Nannochloropsis* sp. *Synechocystis* sp., *Synechococcus* sp., *Nostoc* sp., plankthorax sp., Arthospira sp., *Haematococcus* sp., *Navicula* sp., Cryptomonas sp. Rhodomonas sp. Porphyridium sp., *Phaeodactylum* sp., *Nannochloropsis* sp., *Volvox* sp., Anabena sp., *Chlorella* sp.,

*Euglena* sp., Achnantes sp., *Botryococcus* sp., *Chaetoceros* sp., *Chroococcus* sp., *Cosmarium* sp., *Microcystis* sp., *Microspora* sp., Pediastrum sp., *Scenedesmus* sp., Spirogyra sp., *Spirulina* sp., Zygnema sp., *Chlorobium* sp., *Escherichia* sp., *Spirillum* sp., *Chromobacterium* sp., *Janthinobacterium* sp., *Streptomyces* sp., *Xanthomonas* sp., *Sarcina* sp., *Serratia* sp., *Rhizobium* sp., Prevotela sp., *Actinomyces* sp., *Staphylococcus* sp., *Proteus* sp., Micrococus sp., *Rugamonas* sp., *Pseudomonas* sp., *Helicobacter* sp., *Saccharomyces* sp., *Candida* sp., *Leucosporidium* sp., *Rhodotorula* sp., *Schizosaccharomyces* sp., Dekker sp., *Brettanomyces* sp., *Synechocystis* sp., *Synechococcus* sp., *Nostoc* sp., plankthorax sp., Arthospira sp., *Haematococcus* sp., *Navicula* sp., Cryptomonas sp. Rhodomonas sp. Porphyridium sp., *Phaeodactylum* sp., *Nannochloropsis* sp., *Volvox* sp., Anabena sp., *Chlorella* sp., *Euglena* sp., Achnantes sp., *Botryococcus* sp., *Chaetoceros* sp., *Chroococcus* sp., *Cosmarium* sp., *Microcystis* sp., *Microspora* sp., Pediastrum sp., *Scenedesmus* sp., Spirogyra sp., *Spirulina* sp., Zygnema sp., *Chlorobium* sp., *Escherichia* sp., *Spirillum* sp., *Chromobacterium* sp., *Janthinobacterium* sp., *Streptomyces* sp., *Xanthomonas* sp., *Sarcina* sp., *Serratia* sp., *Rhizobium* sp., Prevotela sp., *Actinomyces* sp., *Staphylococcus* sp., *Proteus* sp., Micrococus sp., *Rugamonas* sp., *Pseudomonas* sp., *Helicobacter* sp., *Saccharomyces* sp., *Candida* sp., *Leucosporidium* sp., *Rhodotorula* sp., *Schizosaccharomyces* sp., Dekker sp., and *Brettanomyces* sp. One skilled in the art will appreciate that other microbes are possible.

According to certain embodiments, the diameter of each of the intact microbial cells is less than about 100 microns. According certain implementations of these embodiments, the microbe is *Haematococcus, Euglena*, and/or *Odontella* sp.

According to further implementations, the diameter of each of the intact microbial cells is less than about 10 microns. According certain implementations of these embodiments, the microbes may be one or more of the following: Plankthorax sp., Arthospira sp., *Synechocystis* sp., *Synechococcus* sp., *Nostoc* sp., Plankthorax sp., Arthospira sp., *Haematococcus* sp., *Navicula* sp., Cryptomonas sp. Rhodomonas sp. Porphyridium sp., *Phaeodactylum* sp., *Nannochloropsis* sp., Achnantes sp., *Botryococcus* sp., *Chaetoceros* sp., *Chroococcus* sp., *Cosmarium* sp., *Microcystis* sp., *Microspora* sp., Pediastrum sp., *Scenedesmus* sp., Spirogyra sp., *Spirulina* sp., Zygnema sp., *Chlorobium* sp., *Escherichia* sp., *Spirillum* sp., *Chromobacterium* sp., *Janthinobacterium* sp., *Streptomyces* sp., *Xanthomonas* sp., *Sarcina* sp., *Serratia* sp., *Rhizobium* sp., Prevotela sp., *Actinomyces* sp., *Staphylococcus* sp., *Proteus* sp., Micrococus sp., *Rugamonas* sp., *Pseudomonas* sp., *Helicobacter* sp., *Saccharomyces* sp., *Candida* sp., *Leucosporidium* sp., *Rhodotorula* sp., *Schizosaccharomyces* sp., Dekker sp., *Brettanomyces* sp., *Lactobacillus* sp., *Pyrococcus* sp., *Corynebacterium* sp., *Aspergillus* sp., *Bacillus* sp., *Streptococcus* sp., *Acetobacter* sp., *Clostridium* sp., *Trichoderma* sp., *Penicillium* sp., *Prochlorococcus* sp., Anabena sp., *Chlorella* sp., *Thermosynechococcus* sp., *Chlamydomonas* sp., *Gloeocapsa* sp., *Anabaenopsis* sp., *Calothrix* sp., *Oscillatoria* sp., Gloebacter sp. Cyanidioschyzon sp., *Crypthecodinium* sp., and/or Galdieria sp.

In certain embodiments, the plurality of microbial cells comprising the microbial biomass are comprised of intact whole cell microbes. In alternative embodiments, the microbial biomass is comprised of disrupted microbial cells (e.g. the integrity of the cell wall and/or cellular membrane has been disrupted). In certain aspects of these embodiments, the microbial biomass is comprised of disrupted microbial cell components. According to certain implementations of these embodiments, one or more microbial components is depleted from the microbial biomass. In exemplary implementations, lipids, amino acids, minerals, and/or colorant molecules are depleted from the microbial biomass.

In certain embodiments, the plurality of microbial cells has been depleted of colorants, but the cells remain otherwise intact.

Purification of Microbial Biomass

In an aspect, the microbial biomass undergoes a purification step. In certain implementations the purification step removes growth media from the microbial biomass. According further implementations, the purifying step further comprises removing internal cell components. According to certain embodiments, the internal cell component are one or more of the following components: lipids, amino acids, minerals, and colorant molecules. In certain embodiments, the removed cell components are a combination of the foregoing.

According to certain aspects, the internal cell components are removed by way of a mechanical wash, alone or in combination with chemical washing process. In certain alternative embodiments, a chemical wash may be performed without a mechanical wash. In certain aspects, the purification step removes salts, and other components of the growth media, and/or solutions generated from any of the processing steps disclosed herein. In exemplary embodiments, contaminants or unwanted material found within the cell growth environment, cell concentrate, cell solution, and or cell powder are removed through the purification step.

In certain aspects, the chemical wash step includes washing the microbial biomass with acid solutions, (e.g., hydrochloric acid, formic acid, acetic acid, phosphoric acid), water, and/or phosphate buffered saline solution.

In certain aspects, purification step further comprises rinsing the biomass with a liquid and incubating the biomass for a period of between about 1 minute and about 24 hours. In certain implementations, the wash liquid is an aqueous, organic, or ionic based liquids.

In exemplary aspects of these embodiments, the biomass is incubated at a temperature of between about −30° C. and about 300° C.

In certain exemplary aspects of these embodiments, the microbial biomass is treated with a phosphoric acid wash (then dispersion in 1M phosphoric acid, and digested (dissolved) while stirring for one hour at 70° C. Thereafter, heat is removed and the suspension is mixed at ambient room temperature for an additional time interval. In exemplary embodiments, the time interval is about 24 hours. According to these embodiments, the long-term room temperature digestion solubilized the mineral impurities which are then filtered and washed using deionized (DI) water).

According to still further embodiments, the purification process further comprises rinsing the biomass with a detergent solution.

According to still further embodiments, the purification step further comprises ultrasonication of the microbial biomass.

Pre-Thermal Processing Wash

In certain implementations, the microbial biomass is washed prior thermal processing. This wash step can be in addition to, or, in certain implementations, in place of the foregoing to purification step. In certain implementations, no pre-thermal wash step is performed. According to certain embodiments, the wash is an acid wash (e.g. pH 1.5 with HCl). In further embodiments, acid wash is followed by one or more washes in water. In certain implementations, an acid was may be performed according to the following procedure: charred biomass may be incubated with acid (e.g., 1% muriatic acid (15.9 mL in 500 mL DI water)) followed by two or more washes in DI water. According to these exemplary embodiments each wash is performed at ambient temperature in a shaking incubator for about 15 minutes. Follow the washes the charred biomass can be centrifuged, then resuspended for subsequent washing or further processing.

In certain embodiments, the purification step and/or washing step results in substantial change to the structural characteristics of individual cells. In certain alternative embodiments, the purification step and/or washing step has minimal to no impact on the structural characteristics of individual cells.

Drying

In certain aspects, the microbial biomass is dried to reduce moisture content and concentrate the cells. In certain implementations, the microbial biomass is dried until moisture content of between about 10%-20%. In further embodiments, the microbial biomass is dried until the moisture content reaches about 5% or lower. The drying step may be performed according to a variety of techniques know in the art. In exemplary embodiments, cells are dried by way of drum filtration, filtration/drying, dead-end filtration, micro-filtration, ultra-filtration, pressure filtration, vacuum filtration, tangential flow filtration, diatomaceous earth filtration, membrane filtration, magnetic separation, forward osmosis, electrofloation, roller press, belt harvesters, capillary extraction, simple heating/evaporation, hydrocyclone, crossflow, assisted separation (magnetic, electric, dielectric, acoustic), granular bed filters, precoat filters, disc stack centrifugation, cross flow filtration, decanter centrifugation, spray drying, or organic flocculation. Drying may be accomplished by techniques described in Advancement and Challenges in Harvesting Techniques for Recovery of Microalgae Biomass, Difusa et. al, which is incorporated by reference herein in its entirety.

In certain exemplary embodiments, the microbial biomass is dried by way of flocculation. According to these embodiments, multivalent metal salts may be employed. In certain embodiments where, auto flocculation is employed, for example at pH of 8-13, and is triggered through the addition of poly electrolytes, polymer, chitosan, sodium hydroxide, potassium hydroxide, calcium hydroxide, magnesium hydroxide, and/or sodium carbonate.

Thermal Processing

According to certain embodiments, following drying of the microbial biomass, the microbial biomass undergoes thermal processing to produce a microbechar. In certain aspects, thermal processing is performed in a reaction vessel. In exemplary implementations, the reaction vessel is capable of producing an air-tight seal, so to exclude any additional gasses from being introduced into the production process. In one embodiment, inert gasses can be added to the container so to force off any unwanted gasses like carbon dioxide, oxygen and any other reactive gas species. In certain alternative embodiments, air and other reactive gasses are added to the combustion chamber so to increase the overall combustion temperature and to facilitate chemical reactions within the chamber. In another embodiment, a various types of inert and reactive gasses may be introduced into the reaction chamber in successive steps to obtain various types of reactions at different points during the heating process. The suitable reaction vessels are comprised of a variety of reaction vessels known in the art. Exemplary reaction vessels, include, but are not limited to: batch reactors, rotary kilns (vertical or horizontal), shaft furnaces, fluidized bed, sprouted bed, entrained bed, screw reactors, herreshoff over/multiple hearth furnace, torbed reactor, microwave reactor, compact moving bed, belt drier/reactor, and fixed bed reactors.

In certain aspects, thermal processing of the cells is performed by way of a process selected from the group consisting of: pyrolysis, gasification, combustion, thermal-oxidative decomposition, torrefaction, and hydrothermal carbonization. In certain embodiments, the thermal processing step involves the use of a combination of the foregoing.

According certain implementations, the thermal processing step is at a temperature range from about 100° C. to about 2000° C. In certain further implementations, the temperature range is from about 100° C. to about 1000° C. In further aspects, the thermal processing temperature range is from 200° C. to about 800° C. . . . In further aspects, the thermal processing temperature range is from 250° C. to about 750° C. In further aspects, the thermal processing temperature range is from 300° C. to about 700° C. In further aspects, the thermal processing temperature range is from 350° C. to about 750° C. In still further aspects, In further aspects, the thermal processing temperature range is from 400° C. to about 700° C. In yet further implements, the thermal processing step is about 400° C. In certain exemplary implementations, the temperature is increased at stepwise intervals. In certain alternative implementations, the temperature is increased at a constant rate over a predetermined interval.

In certain aspects, the thermal processing step is performed at a time interval from about 1 second to about 24 hours. In further aspects, the time interval is from about the thermal processing step is performed at about 600° C. and for a time interval of about 5-7 minutes.

According to certain implementations, the thermal processing step is performed until a predetermined endpoint is reached. According to exemplary implementations, the end point reached when the charred biomass is comprised of fixed carbon of from about 20% to about 75%. According to further embodiments, the end point reached when the charred biomass is comprised of fixed carbon of from about 20% to about 50%. In yet further embodiments, the end point reached when the charred biomass is comprised of fixed carbon of from about 20% to about 30%

In further embodiments, the thermal processing step is performed until the level of proximate volatiles in the charred biomass is below about 25%. In further embodiments, the thermal processing step is performed until the level of proximate volatiles in the charred biomass is below about 20%. In yet further embodiments, the thermal processing step is performed until the level of proximate volatiles in the charred biomass is between about 15% and about 25%.

In yet further embodiments, the thermal processing step is performed until the concentration of oxygen in the charred biomass is below about 20%. In still further embodiments, the thermal processing step is performed until the concentration of oxygen is from about 10 and 15%.

According to still further embodiments, the thermal processing step is performed until the concentration of ash in the charred biomass is below about 20%. According to certain further embodiments, the thermal processing step is performed until the concentration of ash in the charred biomass is between about 10% and 20%. In still further embodiments, the thermal processing step is performed until the concentration of ash in the charred biomass is below about 10%.

In certain aspects the thermo processing step endpoint is defined by a predetermined ratio of oxygen and fixed carbon. In exemplary implementations of these embodiments, the thermo processing endpoint is reached when the ultimate oxygen to ultimate carbon ratio of the charred biomass is below about 0.30 oxygen to carbon (e.g., 3 parts ultimate oxygen to 10 parts ultimate carbon).

In certain embodiments, the endpoint is reached when two or more of the foregoing parameters are reached.

Grinding

In certain implementations, grinding of cell culture component is required to attain an acceptable pigment particle size or cell aggregate diameter of between the values 0.01 microns and 100 microns in particle diameter size. In certain embodiments, the grinding step is performed by way of an apparatus selected from the group consisting of: mortar/pestle, rotary tumbler, vibratory tumbler, magnetic tumbler, roll mills, bead mill agitator, disc mill, basket mill, jet mill, ball mill, jaw crusher, rotor mill, cutting mill knife mill, cryo mill, hammer mill, pin mill, cyclone mill, and classifier mill.

According to further embodiments, the grinding step is performed by way of a method selected from the group consisting of: ammonia freeze explosion, steam hydrolysis, and wet-oxidation.

According to still further embodiments, the grinding step is performed by way of ultrasonication.

According to certain embodiments, the grinding step is performed until the average particle size diameter of the milled microbechar is less than about 10 microns.

In certain implementations, the grinding step comprises adding one or more mechanical grinding additives to the charred biomass during grinding. According to further embodiments, the one or more mechanical grinding additives is selected from a list consisting of: steel, chrome, stainless steel, ceramic, rubber, stoneware, aluminum, magnesium, zirconia, porcelain, silica, and glass. According to certain further embodiments, the mechanical grinding additive has a particle size ranging from about 1/32 inch to about 5 inches in diameter.

In certain aspects, the grinding step comprises adding one or more chemical grinding additives to the charred biomass during grinding. In certain implementations of these embodiments, the one or more chemical grinding additive is selected from the list consisting of: dispersants, surfactants, wetting agents, burnishing compounds, soap detergents, hyperdispersants, nonionic high-HLB polyalkoxylated surfactants, non-ionic polymers, defoamers, water, resins, surface tension modifiers, hydrophobic anionic polymers, acetylenic diol, and acetylenediol.

Post-Grinding Modification of Milled Microbechar

According to certain embodiments, the disclosed method further comprises modifying the milled microbechar after the grinding step. In certain aspects, these post grinding modification steps seeks to reduce the individual particle size. In further aspects, these steps are carried to achieve desired properties of particle surface to make the microbechar suitable for specific applications. According to certain embodiments, post-grinding modification seeks to reduce the heavy metal content of the microbechar In further embodiments, post-grinding processing seeks to removes of soluble inorganic salts and or reduce ash content. In yet further embodiments, post-grinding modification decreases the concentration of total dissolved solids. In further implementations, post-grinding modification comprises adjusting the pH and or increase the surface area of the particles In further aspects, post-grinding processing seeks to further reduce moisture content of the microbechar.

In certain aspects, the modification of the microbechar is by way of the addition of a chemical additive to the microbechar. According to certain implementations of these embodiments, the chemical additive may be: aromatic compounds, alcohols, salts (e.g., ammonium persulfate), surfactants (e.g., Avenel), oils/fats/fatty acids/lipids, water (e.g., steam) ionic liquids, hydrogenation, chemical hydrolysis, enzymatic hydrolysis, alkali solvents (e.g., sodium hydroxide, ammonia, carbon dioxide), carbon dioxide, chlorine gasses, sulfur gasses, nitrogen gasses, and oxygen gasses In certain implementations, post-milling microbechar surface modifications are made through a hydrogen peroxide treatment. In exemplary embodiments, following milling, the microbechar is separated through freeze drying and analyzed for purity. Following separation, the microbechar is further functionalized with a 30% (w/w) hydrogen peroxide solution and refluxed. In certain embodiment reflux occurs for about 24 hours at about 60° C. Following reflux, the excess hydrogen peroxide is removed. In exemplary embodiments, hydrogen peroxide is removed by dialysis against DI water in tubing until no remaining peroxide is detected. The final functionalized powder can then be freeze dried again and analyzed by SEM EDS to help gauge the extent of surface modification.

According to further aspects, the modification of the milled microbechar comprises drying the microbechar. According to these embodiments, this dry step is carried out by way of a method selected from a list consisting of: drum filtration, dead-end filtration, microfiltration, ultra-filtration, pressure filtration, vacuum filtration, tangential flow filtration, diatomaceous earth filtration, membrane filtration, magnetic separation, forward osmosis, electrofloation, roller press, belt harvesters, capillary extraction, simple heating/evaporation, hydrocyclone, crossflow, assisted separation (magnetic, electric, dielectric, acoustic), granular bed filters, precoat filters, disc stack centrifugation, cross flow filtration, decanter centrifugation, and organic flocculation. In certain embodiments, the drying step is performed through a combination of the foregoing.

In certain aspects, the post-milling drying step is performed until a predetermined threshold of moisture reduction has been met. In certain exemplary embodiments, the drying step is performed until the moisture content of the mircobechar is reduced to below about 8%.

Figure 1:
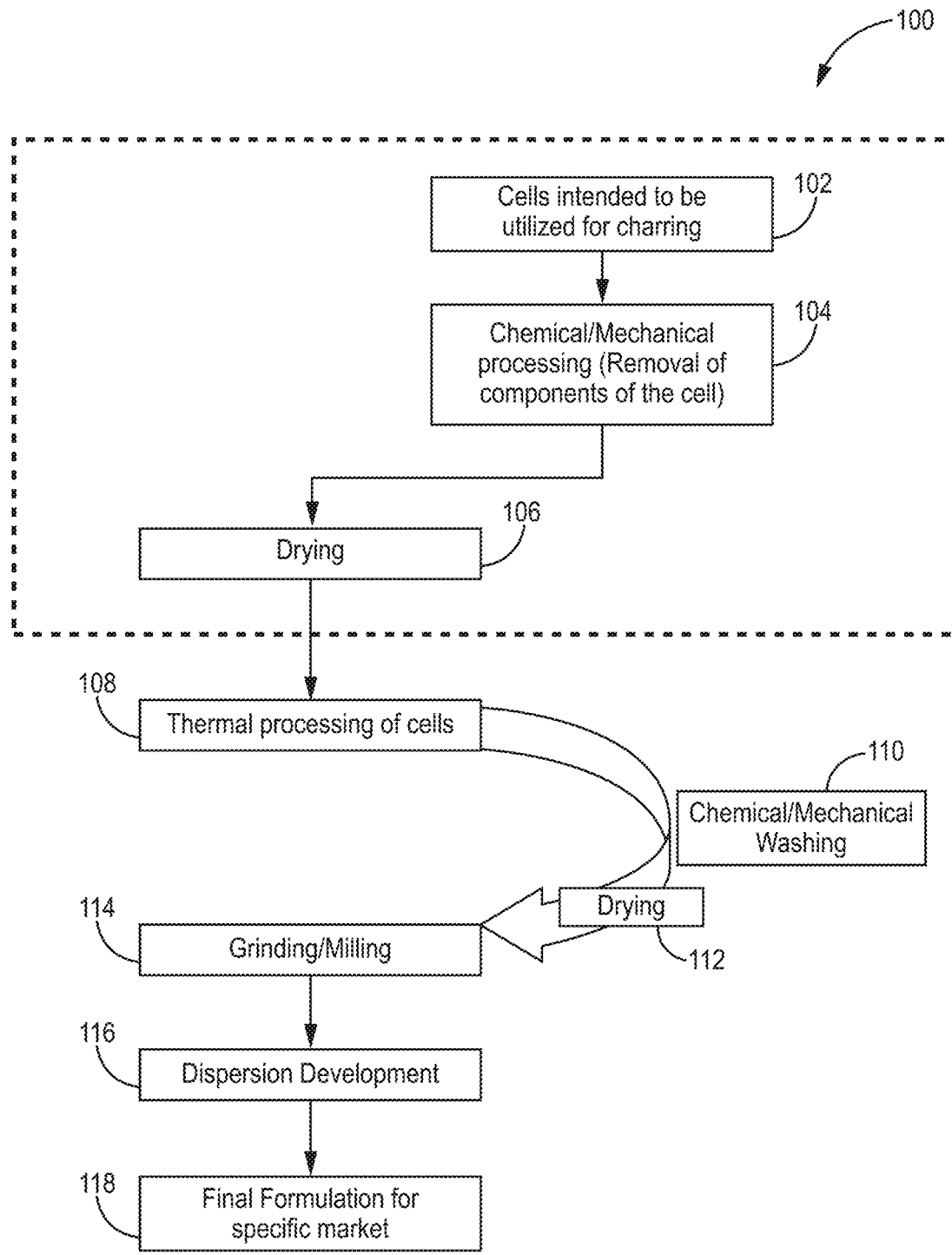
FIG. 1 is a flow chart depicting the method, according to one embodiment.

Turning to the figures, In some embodiments, shown in FIG. 1, the method 100 includes various optional steps and sub-steps that can be performed in any order. In various embodiments the methods can begin at any step and proceed accordingly, as would be understood.

In one embodiment, the method 100 includes selecting or providing cells intended to be utilized for charring (box 102). In another step, various components of the cells are removed by chemical and/or mechanical processes (box 104). In another step, the cells are dried (box 106).

In various of these embodiments, the dried cells are thermally processed (box 108) in another step. In a further step, the thermally processed cells are washed by chemical and/or mechanical washing (box 110). The washed cells may then be dried (box 112) in a subsequent step. In another step the washed and dried cells are then ground and/or milled (box 114). In a subsequent step, a dispersion is developed (box 116). In a final step, the final formulation is created for the specific market (box 118).

In alternative embodiments, the method 100 begins by thermally processing cells (108). In these and other embodiments, the thermal processing (108) is followed by chemical and/or mechanical washing (box 110) and drying (112). A further step includes grinding and/or milling (box 14). Another step includes dispersion development. A still further step include final formulation for the specific market or end product (box 118).

Figure 2:
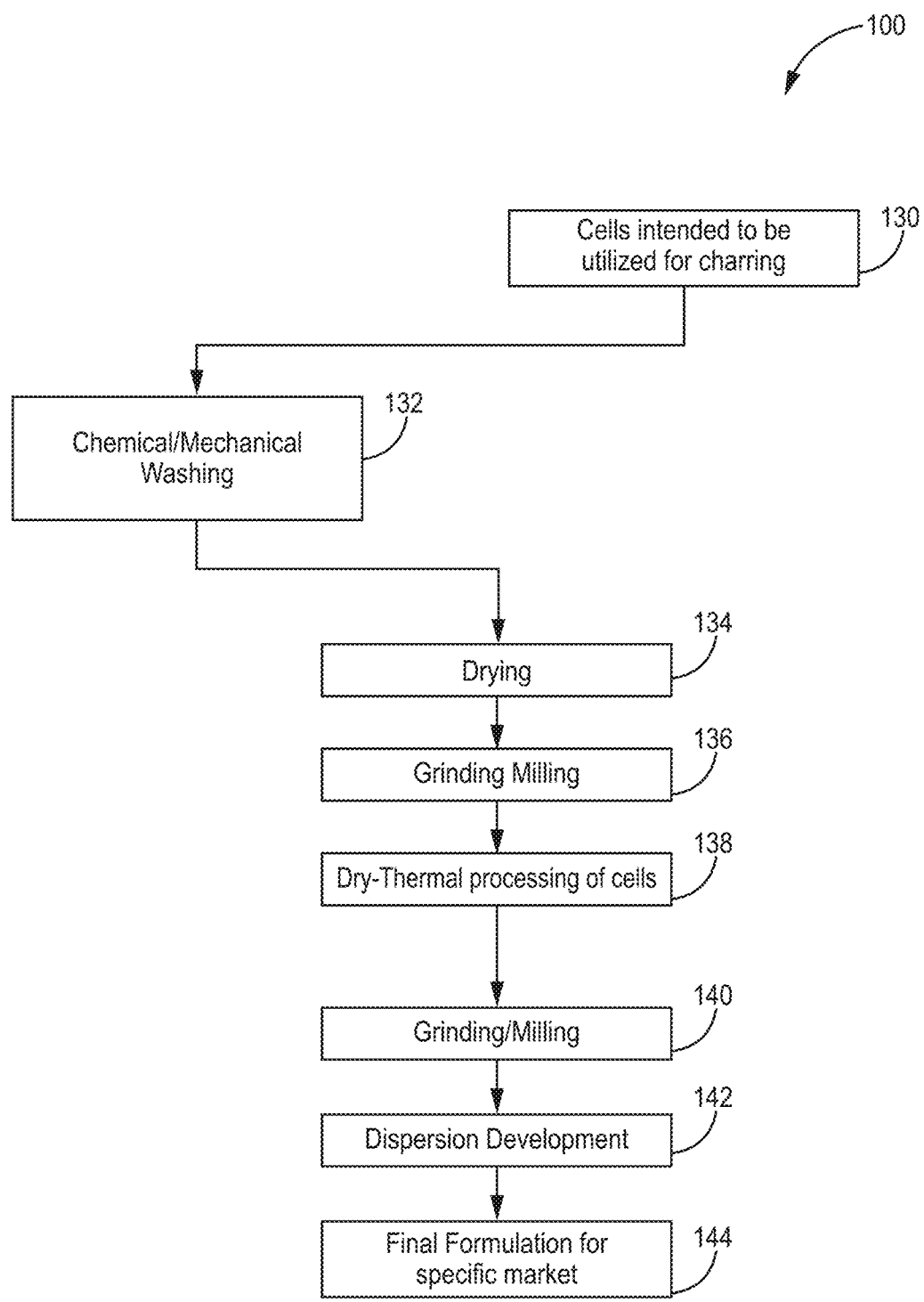
FIG. 2 is a flow chart depicting the method, according to one embodiment.

In various alternative embodiments, as shown in FIG. 2, the method 100 has a first step of procuring the cells intended to be utilized for charring (box 102). In a second step, the procured cells are chemically and/or mechanically washed (box 132). In another step, the washed cells are dried (box 134). In a further step, the dried cells are ground and/or milled (box 136). In a still further step, the cells are dry and are thermally processed (box 138). In a next step, the thermally processed cells are ground and/or milled (box 140). Next, a dispersion is developed (box 142). In a subsequent step, the finish product is created in accordance with a final formulation for a specific market (box 144).

Figure 3:
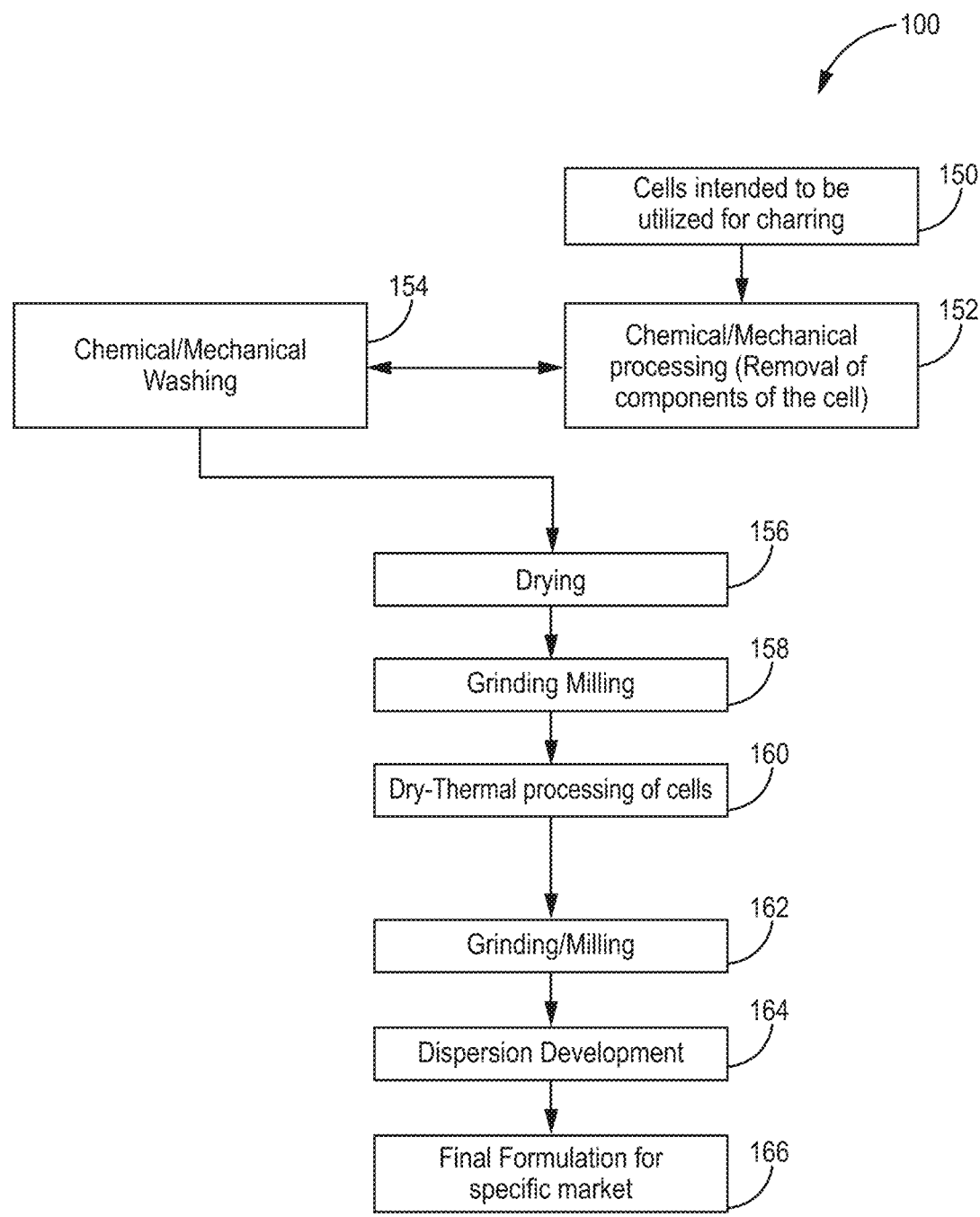
FIG. 3 is a flow chart depicting the method, according to one embodiment.

FIG. 3 depicts a further embodiment of the method 100. In a first step the cells intended to be utilized for charring are selected and/or procured (box 150). In a further step, various cellular components are removed from the cell via chemical and/or physical processing (box 152). In a further step, cells are physically and/or mechanically washed (box 154). In some implementations the steps of removals and washing can be repeated in a cyclical manner. The next step, in some embodiments is drying (box 156) creating a dried product. In a further, the dried product is ground and/or milled via grinding and/or milling processes (box 158). In another step the cells are thermally processed (box 160). In various embodiments, the thermal processing (box 160) is dry thermal processing. In a further step, the thermally process product is ground and/or milled via a grinding and/or milling process (box 162). In another step, a dispersion is developed (box 164). In a final step, the final formulation is created for the desired market (box 166).

Figure 4:
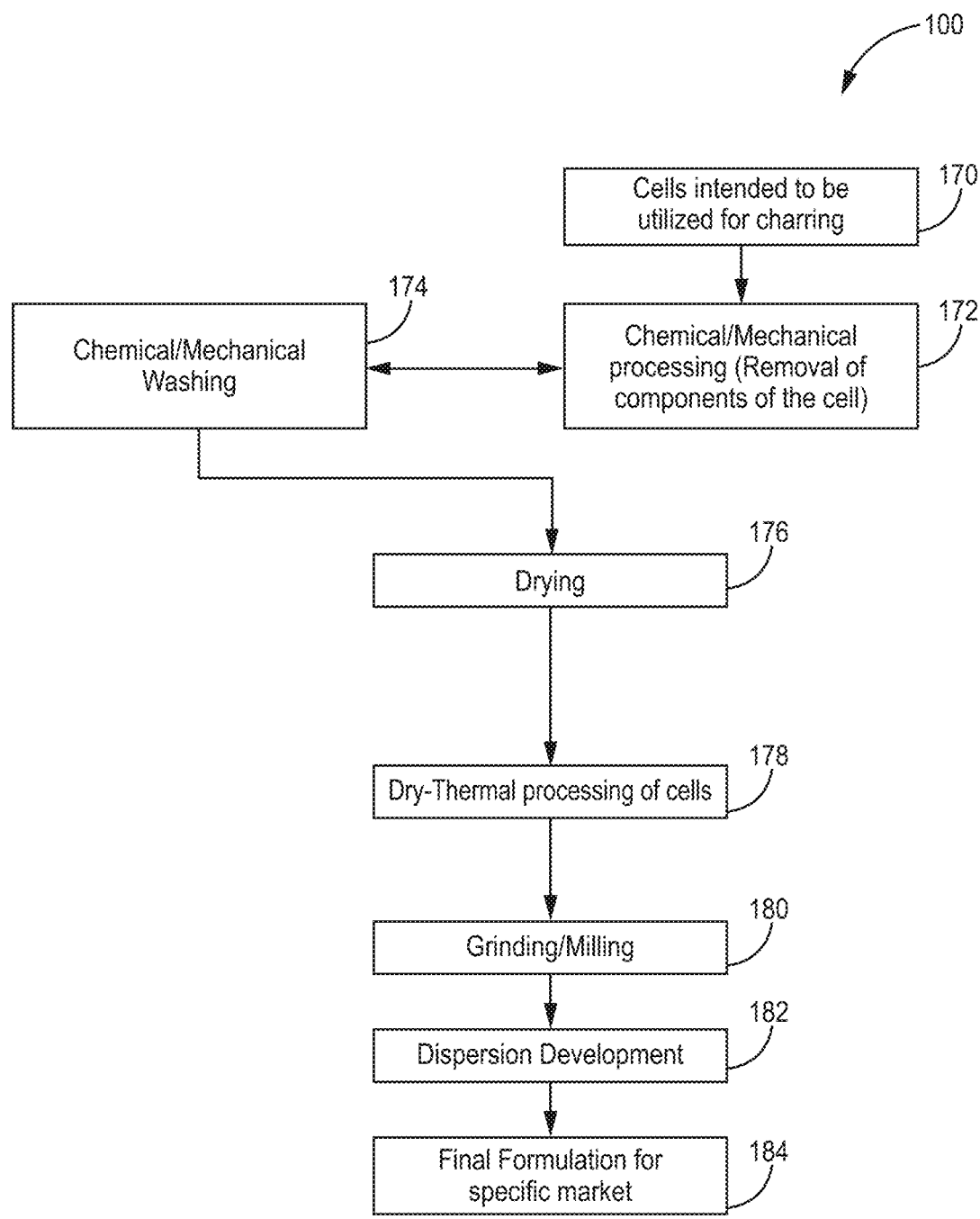
FIG. 4 is a flow chart depicting the method, according to one embodiment.

Another alternative implementation of the method 100 is shown in FIG. 4. In this embodiment, the method 100 begins with the cells intended to be utilized for charring (box 170). Next the cells are chemically and/or mechanically processed for the removal of components of the cells (box 172). Next, the cells are chemically and/or mechanically washed (box 174). In some embodiments the steps of removal and washing can be performed repeatedly and/or in a cyclical manner until the desired intermediate product is made. In another step, the cells are dried (box 176). In a next step, the cells are subject to dry-thermal processing (box 178). In another step, the cells are ground and/or milled (box 180). In another step, a dispersion is developed (box 182). In a next step, the cells are put into a final formulation (box 184).

Figure 5:
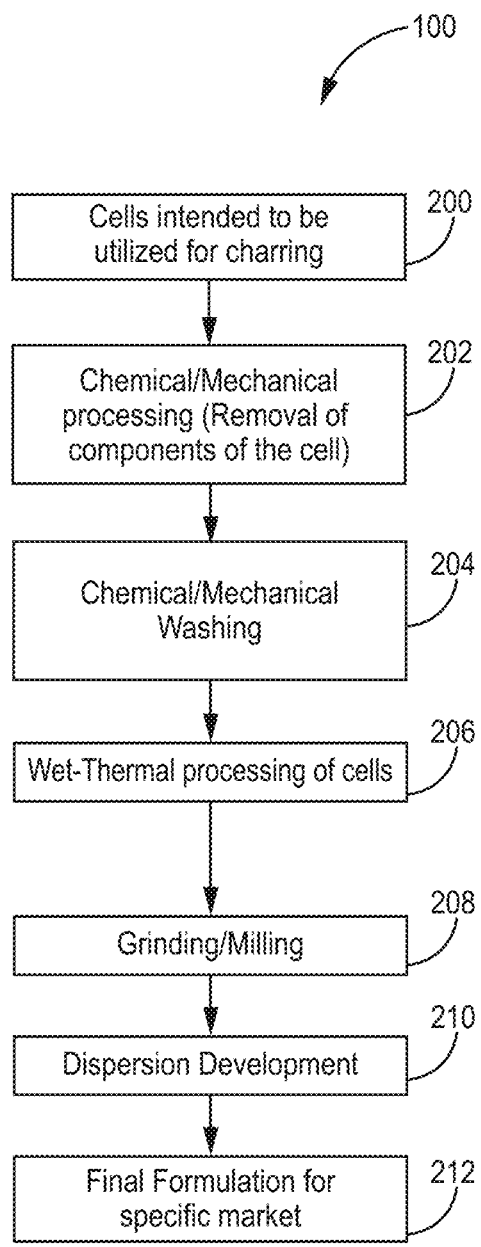
FIG. 5 is a flow chart depicting the method, according to one embodiment.

FIG. 5 shows another exemplary embodiment of the method 100. First, the cells to be used in the process are provided (box 200). Second, the cells are chemically and/or mechanically processed to remove various components of the cells (box 202). Next, the cells are chemically and/or mechanically washed (box 204). In a fourth step, the cells are subject to wet-thermal processing (box 206). In another step, the thermally processed cells are ground and/or milled via grinding and/or milling processes (box 208). In a next step, a dispersion is developed with the cells (box 210). In a final step the cells are placed into a final formulation (box 212).

Figure 6:
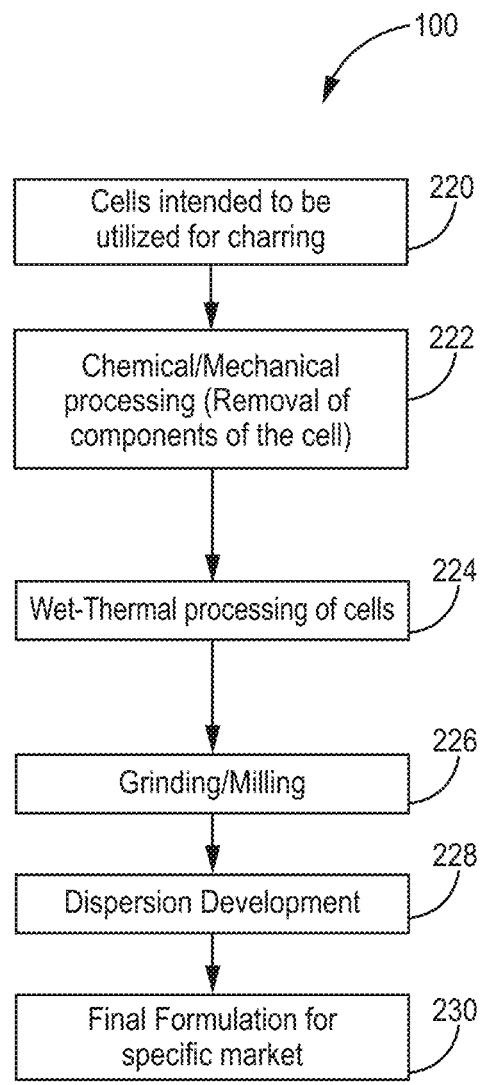
FIG. 6 is a flow chart depicting the method, according to one embodiment.

Another alternative embodiment is shown in FIG. 6. In one step the cells for the method 100 are provided (box 220). In another step, the cells are subject to chemical and/or mechanical processing to remove components of the cells (box 222). In another step, the cells are subject to wet-thermal processing (box 224). Another step includes grinding and/or milling of the cells (box 226). In another step a dispersion is developed (box 228). In a final step, the ink or final product is created according to a final formulation (box 230).

It will be appreciated by those skilled in the art the various steps disclosed herein may be included or omitted depending on the nature of the microbial biomass being used and characteristics of the desired end products. By way of non-limiting example, in certain embodiments, the method is a thermal processing step followed by a washing step, followed by a grinding step. In further embodiments, the method is a thermal processing step followed by a grinding step. In yet further embodiments, the method is a washing step, followed by a thermal processing step, followed by a grinding step. In even further embodiments, the method is a washing step, followed by a thermal processing step, followed by a grinding step, followed by a washing step. In still further embodiments, the method is a washing step, followed by a by a thermal processing step, followed by a washing step, followed by a grinding step.

Ink Formulation

Concentrations of the processed microbial biomass can range anywhere from 0.1-100% (w/w) of the overall composition of an ink and/or colorant formulation. In addition to the replacement of the pigment portion of known formulations, the microbial cells may also partially or fully replace the addition of other formulation components (resins, oils/carriers, additives) commonly found in formulations developed for specific industries that may leverage this colorant technology. This is because changes in the overall cellular components (concentrations and/or types of fatty acids, proteins, carbohydrates, minerals, etc.) within the specific cell type may alter the need for specific formulation components traditionally required to be added to an ink and/or colorant formulation. These pigments can be utilized in organic solvent based colorant formulations as well as aqueous based, or radiation curable colorant formulations.

Alternatively, certain methods may be applied in order to increase the integrity of biological cells as they are leveraged as colorants in various industries. Strategies can include, but are not limited to adding a preservative to the cell cultures prior to colorant formulation. These preservatives act to increase the integrity of individual cells as various treatments are applied in order to formulate the cells for colorant applications. These preservatives can include but are not limited to the following undiluted or any concentration of the following: mono and poly saccharides, mono and poly saccharide alcohols, glucosylglycerol, glycerol, dextrose, saccharose, trehalose, polyethylene glycol, propylene glycol, glycerine, polyvinylpyrolidone, sorbitol, dextran, methanol, dextrins, Dimethyl sulfoxide (DMSO), Sodium benzoate, Potassium metabisulphate, sodium citrate, sodium chloride, Cellulose sulphate, lock's solution, ectoine, Ringer's solution, gelatin, plasma, amino acid, peptide, or protein or combinations thereof like Late Embryogenesis Abundant (LEA) proteins.

An additional strategy to increase the integrity of cells utilized in ink and/or colorant formulations includes the encapsulation of biological cells. The encapsulation medium can be comprised but not limited to undiluted or any concentration of the following substrates: alginate-polylysine-alginate (APA) microcapsules, sodium alginate, Cellulose sulphate, Calcium algenate, Bovine serium albumen, Collagen, Chitosan, Gelatin, Agarose, and formalin.

In certain implementations, the composition of ink and/or colorant that includes the above discussed technology can be combined with none or any mixture of the commonly utilized molecular components within the specific target industry. These include but are not limited to the following: Pigments, resins, oils/carriers, additives, binders and/or resins, acrylic resins, oliogimers, copolymers, uv/eb resins, styrene resins, xylene, toluene and urethane resin, abrasion resistance additives, adhesion promoters, air-release additives, anti blocking additives, anti cratering additives, antifloating additives, anti-flocculation additives, anti flooding additives, anti foaming additives, anti gassing additives, anti sagging additives, anti-setting additives, anti-static additives, fungicides, barrier additives, carriers bases, atalysts, chelating additives, chemical resistant additives, coalescing aids, color locking additives, conductive additives, corrosion protection additives, coupling agents, crosslinkers/chain extenders, curing agents, deaerators/anti-gassing agents, dessicants/driers, dispersing additives, emulsifying additives, film foaming additives, flame retardants, flexibilizing agents, flow and leveling additives, fluorescent whitening agents, free flow additives, gloss enhancers, hardeners, heat resistant additives, impact modifiers, initiators, lubricants, mar/scratch resistance additives, matting flatting additives, moisture scavengers, opacifiers, ph control, plasticizers, reinforcing additives, release aids, scrub resistant additives, skid/slip resistant, slip additives, solvent resistant additives, special effect additives, and wetting additives.

Pigments and colorants made according to the disclosed method are suitable for use in various industrial applications. These applications include but are not limited to the following: paint production industry, ink production industry, pigment production industry, coatings industry, colorant industry, inkjet industry, printing industry, textiles industry, food colorants industry, nutraceutical industry, agriculture industry, soap and grooming industry, cosmetics industry and any industry comprised within.

The printing types that may be used with this innovation include but are not limited to the following: silk and rotary screen coating, screen printing, offset lithography, flexography, forward roller coating, reverse roll coating, spray coating, air knife coating, anilox coating, flexocoating, dip coating, metering rod coating, roller coating, kiss coating, extrusion coating, curtain coating, dip coating, spin coating, digital printing: inkjet and xerography, gravure, 3-D printing, dye-sublimation, pad printing, relief print, intaglio, radiation curable, hot dye sublimation and any subset of printing type described within.

Ink types that may leverage this technology include but are not limited by the following: Water-Based Inks, Solvent Inks, Vegetable Inks, Latex based Inks, Radiation Curable Inks, Phase Change Inks and any subset of printing type described within.

In certain implementations, production of the ink and or colorant formulation comprises a number of steps. In one step, 25 ml of a high density culture (as measured by an optical density of the culture of ~15 OD730) of microbes is centrifuged at anywhere 3000-10000×g in a suitable centrifugation device. In a further step, the supernatant is decanted, leaving only the cells and small amounts of growth media in the tube. The concentration of cells remaining should comprise 5%-25% of the overall volume. To this solution 200 mg of cellulose (making up a 40 g/l concentration) is added to the culture, as well as 200 uL of gum Arabic to make the concentration of gum Arabic 4% of the total solution volume. This generates 5 ml of final ink solution, suitable for use on a screen printer.

In certain implementations, grinding of cell culture component is required to attain an acceptable pigment particle size or cell aggregate diameter of between the values 0.01 microns and 100 microns in particle diameter size. Particle size reduction methods that can be used may include but are not limited to the following: mortar/pestle, rotary tumblers, vibratory tumblers, magnetic tumblers, roll mills, bead mill agitators, disc mills, basket mills, jet mills, ball mills, jaw crushers, rotor mills, cutting mills and knife mills. In addition to the method of grinding, various physical grinding media as well as chemical additives may be introduced into any of the above-mentioned grinding methods, to further increase grinding efficiency. Physical additives such as grinding media may be comprised of but are not limited to the following: steel, chrome, stainless steel, ceramic, rubber, stoneware, aluminum, magnesium, zirconia, porcelain, silica, and glass. This grinding media may come in various sizes that range from $\frac{1}{32}$ inch to 5 inch in diameter. Chemical additives may include dispersants, surfactants, wetting agents, burnishing compounds, soap detergents, hyperdispersants, nonionic high-HLB polyalkoxylated surfactants, non-ionic polymers, defoamers, water, resins, surface tension modifiers, hydrophobic anionic polymers, acetylenic diol, and Acetylenediol.

Production of a Biological Cell Derived Black Colorant Via Thermal Processes

Biologically derived black biochar pigments to be utilized as colorants in various formulations and various industries: In certain implementations a black biologically-derived pigment may be utilized in various potential ink and/or colorant embodiments. Various biological sources may be leveraged as "starting" material for the production of a black biologically derived pigment, as described earlier within this document. Several mechanisms may be utilized to achieve a black biologically-derived pigment. One embodiment of a production mechanism includes a processing step that occurs after growth, isolation, and dewatering of the biomass. This processing step utilizes a thermal treatment process that can be applied to a microbial culture that comprises one or a multitude of biomass sources previously described in this document. Pyrolysis, gasification, combustion and/or a combination of these processes may be used to generate the final microbial-derived black pigment. In this process, growth media is removed from the cell culture so that the water content of the microbial culture is anywhere between 0% and 75% v/v. This pre-drying may include but are not limited to the following processes, ambient air drying, forced air drying, steam drying, centrifugation, spray drying, and jet milling. This dried algal culture is then placed into an appropriate container, that is capable of producing an air-tight seal, so to exclude any additional gasses from being introduced into the production process. In one embodiment, inert gasses can be added to the container so to force off any unwanted gasses like carbon dioxide, oxygen and any other reactive gas species. In a separate embodiment, air and other reactive gasses are added to the combustion chamber so to increase the overall combustion temperature and to facilitate chemical reactions within the chamber. In another embodiment, a various types of inert and reactive gasses may be introduced into the reaction chamber in successive steps to obtain various types of reactions at different points during the heating process. Once the microbial biomass is added to the appropriate chamber, the chamber is heated to a constant temperature that can be within the range of 100° to 1000° Celsius or any temperature in between. In an alternative embodiment, multiple temperature stages may be applied to the biomass chamber over a certain timeframe. Once the appropriate temperature setting is reached, the temperature is held for a specific length of time, that can be within the range of 1 minute to 24 hours. This is repeated for any temperature setting that may be required throughout the heating process. The length of time required to reach a stable holding temperature may ramp quickly (matter of seconds to go between two treatment temperatures), or may ramp rather slowly, as in a matter of 6 hours, or anywhere in-between these provided ramp rates. Once the desired heating regimen has completed, cooling of the microbial biomass may follow a gradual process or a staged process that follows that described in the heating process. Further processing of the algal biomass may or may not be required. In one embodiment, a rinse is applied to the biomass. This rinsing process includes adding liquid to the biomass and heating the biomass to temperatures that are between 30° Celsius and 300° Celsius for a set amount of time that may fall in between the range of 5 minutes to 12 hours. These processes may be performed once or potentially multiple times on the same batch of microbial biomass. Additional drying steps may or may not be included in this process. Specific apparatuses and/or process may be used and/or implemented so to decrease the overall amount of particle clumping that may occur during the pigment treatment process. Grinding processes may or may not be implemented after the final drying process has completed. Additionally, greater surface area and surface treatment of smaller particle size may be achieved by gas treatment, chemical treatment, or other surface treatment which is known to those skilled in the part of pigment manufacturing.

EXPERIMENTAL EXAMPLES

The following examples are put forth so as to provide those of ordinary skill in the art with a complete disclosure and description of how the articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Procedures

All data was collected following the below procedures unless otherwise stated:

TGA Procedure (Charring Process):

Thermogravimetric analysis or thermal gravimetric analysis (TGA) is a method of thermal analysis in which the mass of a sample is measured over time as the temperature changes. A maximum amount of powdered material, sieved to <50 μm was loaded in the 5 mL TGA cup (usually 2-3 g). The instrument was purged with nitrogen gas for 15 min before the start of the run, as well as during the run, to create an inert atmosphere around the cup. Run was performed by temperature ramping at 30 C/min to 150 C, then 50 C/min to the set temp. Test duration (hold at set temperature) was 15 min, followed by passive cooling upon completion of test. Yield measurements were measured by measuring before and after masses of each sample. All samples charred at 500c set temperature unless otherwise noted in individual tables.

PSD Procedure (Median Size and Mean Size Measurements):

Particle size distribution of a sample was measured using a Horiba Particle Size Distribution Analyzer LA-950 V2. For samples that contained larger particles (>100 μm), a manual dry-screening method using sieves of various sizes was used in combination with Horbia.

SEM Procedure (SEM Images):

Scanning electron microscopic images were acquired for all the samples pre and post TGA. Images were acquired using the Jeol/EQ InTouchscope. 5-10 mg of sample was dusted onto a double sided carbon fixed onto an SEM stub. Samples were sputter coated with gold and palladium prior to reduce any charging during imaging. Images were acquired at 150×, 500× and 1500× magnification.

Preparation of Pigment Dispersion for Color Analysis: (Ave. L, Ave. A, and Ave. B Measurements and Drawdown Images)

Prepared a Dispersion Master Mix:

| DI water | 0.26 g |
|---|---|
| Neutralized Joncryl 296 | 0.689 g |
| Dispersion agent CT171 | 0.078 g |
| Defoamer DF58 | 0.013 g |

Mixed 2 g zirconium beads with 1.1 ml of dispersion master mix. Added 0.2 g of the TGA samples to this dispersion mix. Pigment dispersion was prepared by bead beating at speed 42R for 3 min (at 30 sec interval with 1 min OFF) using the Biospec 3110Bx Mini beadbeater. Tubes were incubated the tube at RT for 15 minutes to cool down. 150 L was used for determination of particle size using grind gauge. 250 uL used for draw down on the Leneta Ink test sheet. Drawdowns were dried for 24 h before taking L, a, b measurements using the YD5050 spectro-densitometer by 3 nH.

Acid Washing for Color Analysis: (Ave L, Ave. A, Ave. B—Post Char Wash Data)

Post TGA acid washing performed for baseline, baseline rerun and prewash samples. 1 g post TGA sample washed with 25 ml 1% muriatic acid (1:25 biomass ratio). Washing achieved by 15 min shaking incubation. Centrifuged at 5000 g for 5 min to collect the acid washed char. Performed a water wash with 25 ml DI water to remove residual acid and salts dissolved in water. Dried the washed char overnight at 55 C. Dispersions from acid washed char prepared as described above. Difference in color between the unwashed and post acid washed was recorded.

Dispersion Drawdowns:

250 μl of the pigment dispersion was drawn down at a consistent speed using #7 bar on a vellam opaque Leneta ink test sheet. The ink was allowed to dry for 24 h before taking the L, a, b measurements using the spectrodensitometer. Three L, a, b values were taken from 3 different areas on the drawdown and averages.

Example 1

Figure 8:
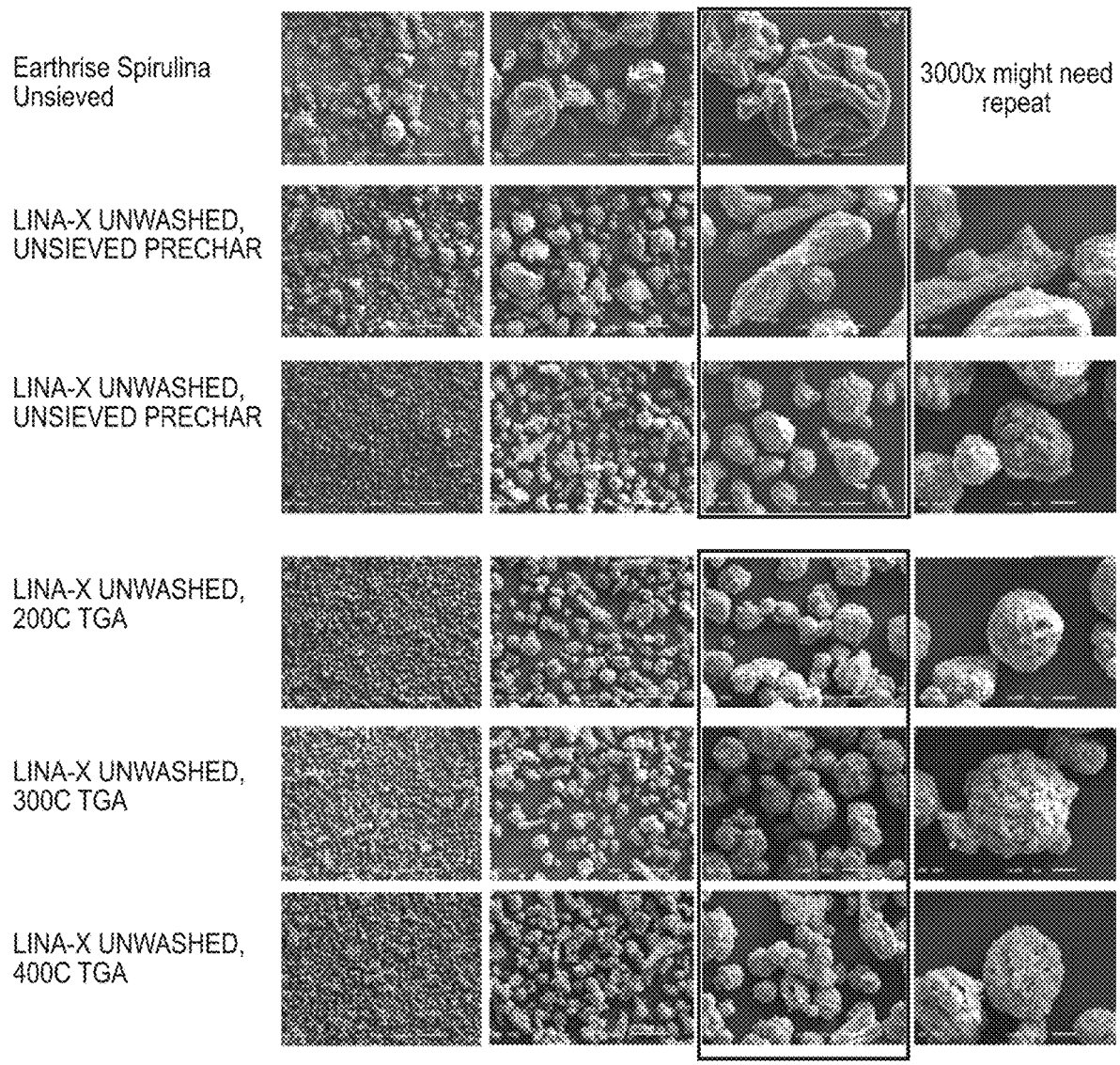
FIG. 8 shows magnified images of decolored *spirulina* including unsieved Earthrise *Spirulina*; unsieved, prechar, unwashed LinaX; sieved prechar, unwashed LinaX; unwashed 200° C. TGA LinaX; unwashed 300° C. TGA LinaX; and unwashed 400° C. LinaX.

The below data tables (Tables 1 and 2) and FIGS. 7 and 8 highlight the data collected on the prokaryote *Spirulina* in several different forms. Experiment Name: BASELINE TESTS.

All starting biomass material was sieved to below 50 μm via hand sieving prior to charring Key:
  proximate—an assay of the moisture, ash, volatile matter, and fixed carbon as determined by following ASTM D3172.
  ultimate—in the case of coal and coke, the determination of carbon and hydrogen in the material, as found in the gaseous products of its complete combustion, the determination of sulfur, nitrogen, and ash in the material as a whole, and the calculation of oxygen by difference. This data was determined by following ASTM D3176.

WC=whole cell
NO CHAR=data was collected on a pre char sample.
Unwash=data was collected prior to any post-charring washing
post-char wash=data was collected post an acid washing that was performed on the charred material
Spirulina decolored=color molecules were removed via a solvent removal prior to sampling.
Temperature indicates temperature that sample was charred at for designated time
Biomass Origins/alternative naming structure:
*Spirulina*: Earthrise Nutraceuticals

TABLE 1

| BASELINE | Proximate-Volatiles (%) | Proximate-Fixed Carbon (%) | Ulitmate-Carbon (%) | Ulitmate-Hydrogen (%) | Ulitmate-Nitrogen (%) | Ulitmate-Sulfur (%) | Ulitmate-Ash (%) | Ulitmate-Oxygen* |
|---|---|---|---|---|---|---|---|---|
| WC Spirulina NO CHAR | 83.86 | 11.04 | 52.44 | 6.78 | 11.79 | 0.679 | 5.1 | 23.22 |
| Spirulina decolored NO CHAR | 58.26 | 10.84 | 36.21 | 5.88 | 7.62 | 0.644 | 30.9 | 18.75 |
| Spirulina decolored-200c Char | 55.41 | 11.44 | 37.03 | 4.97 | 7.91 | 0.63 | 33.15 | 16.31 |
| Spirulina decolored-300c Char | 35.57 | 20.37 | 35.57 | 3.52 | 6.87 | 0.165 | 44.06 | 9.81 |
| Spirulina decolored-400c Char | 12.75 | 24.95 | 27.32 | 1.73 | 4.61 | 0.184 | 62.3 | 3.85 |
| Spirulina decolored-500c Char | 7.16 | 30.4 | 25.59 | 0.95 | 3.72 | 0.042 | 62.44 | 7.26 |
| Spirulina decolored-600c Char | 7.31 | 26.79 | 25.55 | 0.48 | 3.19 | 0.014 | 65.9 | 4.87 |
| Spirulina decolored-700c Char | 4.5 | 27.48 | 26.11 | 0.23 | 2.83 | 0.046 | 68.02 | 2.77 |

TABLE 2

| BASELINE | Median size (um) | Mean size (um) | Avg. L unwash | Avg. A unwash | Avg. B unwash | Avg. L post-char wash | Avg. A post-char wash | Avg. B post-char wash | Yield (%) |
|---|---|---|---|---|---|---|---|---|---|
| WC Spiru PRE-NO CHAR | 8.62525 | 9.04029 | | | | | | | |
| control prechar-NO CHAR | 21.41089 | 22.63262 | | | | | | | |
| Spirulina decolored-200c Char | 21.41089 | 20.76529 | 67.79 | 5.053333 | 32.26333 | 52.64333 | 8.326667 | 33.09 | 89.9 |
| Spirulina decolored-300c Char | 18.71191 | 19.61427 | 32.39333 | 8.356667 | 14.19 | 19.87667 | 4.296667 | 4.793333 | 65.8 |
| Spirulina decolored-400c Char | 15.90681 | 16.68876 | 22.78333 | 1.926667 | 3.633333 | 17.86333 | 0.52 | 1.573333 | 46.8 |
| Spirulina decolored-500c Char | 15.00484 | 15.66284 | 29.99333 | 1.03 | 2.34 | 14.12667 | 0.513333 | 1.753333 | 42.7 |
| Spirulina decolored-600c Char | 14.05136 | 14.68733 | 29.42667 | 0.29 | 1.183333 | 14.38 | 0.516667 | 1.693333 | 42.2 |
| Spirulina decolored-700c Char | 15.56834 | 16.33563 | 28.28333 | 0.296667 | 0.603333 | 15.46 | 0.146667 | 1.496667 | 41.48 |

Example 2

The below data tables (Tables 3 and 4) and FIGS. 9 and 10 highlight the data collected on the Eukaryote *Nannochloropsis* in several different forms. Experiment Name: BASELINE RERUN.

Key:
  proximate—an assay of the moisture, ash, volatile matter, and fixed carbon as determined by following ASTM D3172.
  ultimate—in the case of coal and coke, the determination of carbon and hydrogen in the material, as found in the gaseous products of its complete combustion, the determination of sulfur, nitrogen, and ash in the material as a whole, and the calculation of oxygen by difference. This data was determined by following ASTM D3176.
  WC=whole cell.
  NO CHAR=data was collected on a pre char sample.
  Unwash=data was collected prior to any post-charring washing
  post-char wash=data was collected post an acid washing that was performed on the charred material
  Defatted *Nannochloropsis*=lipid molecules were removed via a solvent removal prior to sampling
  Temperature indicates temperature that sample was charred at for designated time
  Biomass Origins/alternative naming structure:
    Defatted *Nannochloropsis*: Qualitas Health

TABLE 3

| | Proximate-Volatiles (%) | Proximate-Fixed Carbon (%) | Ulitmate-Carbon (%) | Ulitmate-Hydrogen (%) | Ulitmate-Nitrogen (%) | Ulitmate-Sulfur (%) | Ulitmate-Ash (%) | Ulitmate-Oxygen*- (%) |
|---|---|---|---|---|---|---|---|---|
| Defatted Nannochloropsis-NO CHAR | 60.78 | 6.89 | 37.83 | 4.46 | 7.94 | 0.635 | 32 | 16.8 |
| Defatted Nannochloropsis-200c | 57.42 | 9.11 | 38.75 | 4.44 | 8.36 | 0.968 | 33 | 14 |
| Defatted Nannochloropsis-300c | 33.32 | 19.79 | 37.68 | 3.25 | 6.61 | 1.148 | 47 | 4.43 |
| Defatted Nannochloropsis-400c | 24.14 | 12.12 | 27.66 | 1.37 | 4.55 | 0.853 | 64 | 1.82 |
| Defatted Nannochloropsis-500c | 36.24 | 0.01 | 26.5 | 0.71 | 4.1 | 0.972 | 68 | <0.01 |
| Defatted Nannochloropsis-600c | 8.68 | 22.04 | 26.08 | 0.29 | 3.56 | 0.464 | 69 | 0.33 |
| Defatted Nannochloropsis-700c | 8.5 | 22.87 | 25.05 | 0.03 | 3.27 | 0.402 | 69 | 2.62 |

TABLE 4

| | Median size (um) | Mean size (um) Qual | Avg. L unwash | Avg. A unwash | Avg. B unwash | Avg. L post-char wash | Avg. A post-char wash | Avg. B post-char wash | Yield (%) |
|---|---|---|---|---|---|---|---|---|---|
| Defatted Nannochloropsis-NO CHAR | 26 | 32 | | | | | | | |
| Defatted Nannochloropsis-200c | 23 | 29 | 70 | 8.1 | 33 | 66 | 10 | 36 | 89 |
| Defatted Nannochloropsis-300c | 50 | 62 | 38 | 4.1 | 7.5 | 29 | 4.3 | 5.9 | 66 |
| Defatted Nannochloropsis-400c | 83 | 91 | 36 | 1.1 | 3.2 | 25 | 1.1 | 2.1 | 46 |
| Defatted Nannochloropsis-500c | | 267 | 37 | 0.4 | 1.8 | 29 | 0.3 | 0.9 | 43 |
| Defatted Nannochloropsis-600c | | 248 | 38 | 0.9 | 2.5 | 30 | 0.6 | 1.2 | 41 |
| Defatted Nannochloropsis-700c | | 206 | 35 | 0.2 | 0.9 | 31 | 0.2 | 0.2 | 40 |

Example 3

The below data tables (Tables 5 and 6) and FIGS. 10-20 highlight the data collected on the Multiple prokaryote and Eukaryote species in several different forms. Experiment Name: SPECIES DIFFERENCE/RESIDUAL BIOMASS.
Key:
proximate—an assay of the moisture, ash, volatile matter, and fixed carbon as determined by following ASTM D3172.
ultimate—in the case of coal and coke, the determination of carbon and hydrogen in the material, as found in the gaseous products of its complete combustion, the determination of sulfur, nitrogen, and ash in the material as a whole, and the calculation of oxygen by difference. This data was determined by following ASTM D3176.
WC=whole cell
NO CHAR=data was collected on a pre char sample
Unwash=data was collected prior to any post-charring washing
Defatted *Nannochloropsis*=lipid molecules were removed via a solvent removal prior to sampling
Defatted/Deproteinated *Nannochloropsis*=both lipid and proteins were removed via separate processes
Temperature indicates temperature that sample was charred at for designated time
Biomass Origins/alternative naming structure:
  *E. coli*—Internal strain.
  Yeast—Internal strain waste biomass
  Whole cell *Spirulina*—Earthrise brand-purchased from retail store
  Whole cell *Nannochloropsis*—Qualitas Health
  Whole cell *Chlorella*—Manna Brand purchased from retail store
  Pine sawdust—commercially purchased.
  Defatted *Nannochloropsis*—Qualitas Health.
  Defatted/Deproteinated *Nannochloropsis*—Qualitas Health

TABLE 5

| sample name | Proximate-Volatiles (%) | Proximate-Fixed Carbon (%) | Ulitmate-Carbon (%) | Ulitmate-Hydrogen (%) | Ulitmate-Nitrogen (%) | Ulitmate-Sulfur (%) | Ulitmate-Ash (%) | Ulitmate-Oxygen *(%) |
|---|---|---|---|---|---|---|---|---|
| *E. coli*-NO CHAR | 70.9 | 20.64 | 51.95 | 6 | 11.32 | 0.304 | 8.46 | 21.97 |
| *E. coli* 200c | 71.2 | 17.88 | 55.69 | 6.16 | 12.23 | 0.471 | 10.92 | 14.54 |
| *E. coli* 500c | | | | | | | | |
| Yeast-NO CHAR | 78.59 | 12.68 | 47.53 | 6.54 | 10.29 | 0.329 | 8.74 | 26.58 |
| Yeast 200c | 75.62 | 15.23 | 51.88 | 6.38 | 10.47 | 0.376 | 9.15 | 21.75 |
| yeast 500c | | | | | | | | |
| WC Spirulina-NO CHAR | 83.86 | 11.04 | 52.44 | 6.78 | 11.79 | 0.679 | 5.1 | 23.22 |
| wc spirulina 200c | 94.12 | 0.01 | 55.54 | 7.04 | 12.2 | 0.828 | 6.14 | 18.26 |
| wc spirulina 500c | | | | | | | | |
| WC Nannochloropsis-NO CHAR | 82.35 | 12 | 57.64 | 7.65 | 9.29 | 0.499 | 5.65 | 19.27 |
| WC Nannochloropsis 200c | 92.14 | 1.64 | 59.03 | 7.43 | 9.31 | 0.656 | 6.22 | 17.35 |
| wc Nannochloropsis 500c | | | | | | | | |
| WC chlorella-NO CHAR | 80.85 | 13 | 53.31 | 6.99 | 9.94 | 0.566 | 6.15 | 23.05 |
| WC chlorella 200c | 92.47 | 1.69 | 57.11 | 7.28 | 10.46 | 0.641 | 5.85 | 18.66 |
| wc chlorella 500c | | | | | | | | |
| Pine saw dust-NO CHAR | 87.87 | 10.99 | 52.56 | 6.14 | 0.17 | 0.009 | 1.14 | 39.98 |
| pine saw dust 200c | 98.12 | 1.33 | 55.04 | 8.08 | 0.18 | 0.009 | 0.55 | 36.15 |
| pine saw dust 500c | | | | | | | | |
| Defatted Nannochloropsis-NO CHAR | 72.99 | 5.1 | 44.54 | 5.63 | 9.72 | 0.42 | 21.91 | 17.78 |
| Defatted Nannochloropsis-200c | 65.68 | 12.12 | 46.19 | 6.36 | 9.99 | 0.53 | 22.2 | 14.73 |
| Defatted Nannochloropsis-500c | | | | | | | | |

TABLE 5-continued

| sample name | Proximate-Volatiles (%) | Proximate-Fixed Carbon (%) | Ulitmate-Carbon (%) | Ulitmate-Hydrogen (%) | Ulitmate-Nitrogen (%) | Ulitmate-Sulfur (%) | Ulitmate-Ash (%) | Ulitmate-Oxygen *(%) |
|---|---|---|---|---|---|---|---|---|
| Defatted/Deproteinated Nannochloropsis-NO CHAR | 62.41 | 0.01 | 33.67 | 4.13 | 6.04 | 1.557 | 39.22 | 15.38 |
| Defatted/Deproteinated Nannochloropsis-200c | 58.01 | 2.67 | 34.59 | 4 | 6.14 | 1.769 | 39.32 | 14.17 |
| Defatted/Deproteinated Nannochloropsis-500c | | | | | | | | |

TABLE 6

| sample name | Median size (um) | Mean size (um) | Avg. L unwash | Avg. A unwash | Avg. B unwash | yield (%) |
|---|---|---|---|---|---|---|
| E. coli-NO CHAR | 11.91412 | 15.47662 | | | | |
| E. coli 200c | 16.42545 | 17.66958 | 18.52 | 3.766667 | −2.12333 | 87 |
| E. coli 500c | 49.92191 | 67.73891 | 32.75667 | 0.47 | 1.21 | |
| Yeast-NO CHAR | 2.54334 | 3.11618 | | | | |
| Yeast 200c | 28.20223 | 29.47804 | 80.51333 | 6.846667 | 41.23667 | 81.2 |
| yeast 500c | 47.29337 | 63.41695 | 31.34333 | 0.466667 | 2.183333 | 24.4 |
| WC Spirulina-NO CHAR | 8.62525 | 9.04029 | | | | |
| wc spirulina 200c | 36.77574 | 37.79323 | 65.22 | −1.34 | 33.2 | 91.1 |
| wc spirulina 500c | 25.19921 | 36.27533 | 30.32 | 0.316667 | 1.67 | |
| WC Nannochloropsis-NO CHAR | 5.19906 | 10.1863 | | | | |
| WC Nannochloropsis 200c | 35.65385 | 35.48044 | 56.74667 | 7.29 | 37.37667 | 93.3 |
| wc Nannochloropsis 500c | 135.6199 | 150.4038 | 28.49667 | 0.523333 | 0.883333 | 23 |
| WC chlorella-NO CHAR | 6.23921 | 7.0222 | | | | |
| WC chlorella 200c | 40.15826 | 40.52318 | 52.53 | 3.103333 | 32.37 | 91.1 |
| wc chlorella 500c | 69.82796 | 77.598 | 32.63667 | 0.19 | 2.066667 | |
| Pine saw dust-NO CHAR | 30.2041 | 38.90293 | | | | |
| pine saw dust 200c | 35.27666 | 37.45507 | 82.49333 | 5.05 | 26.73667 | 87.2 |
| pine saw dust 500c | 36.52929 | 38.60395 | | | | 19.3 |
| Defatted Nannochloropsis-NO CHAR | 17.54437 | 27.77073 | | | | |
| Defatted Nannochloropsis-200c | 12.9105 | 14.99028 | 68.64667 | 5.633333 | 36.62 | |
| Defatted Nannochloropsis-500c | 32.01711 | 32.41792 | 31.97 | 0.866667 | 1.226667 | |
| Defatted/Deproteinated Nannochloropsis-NO CHAR | 2.42558 | 2.68534 | | | | |
| Defatted/Deproteinated Nannochloropsis-200c | 58.50219 | 66.25181 | 62.83333 | 8.366667 | 29.07333 | |
| Defatted/Deproteinated Nannochloropsis-500c | 22.86886 | 25.8563 | 25.03 | −0.07333 | 0.703333 | |

Example 4

The below data tables (Tables 7 and 8) and FIGS. 21-26 highlight the data collected on the species *Spirulina* in several different forms. Experiment Name: PRE WASH Biomass Washing Specifics:
  1:25 biomass ratio (20 g LinaX in 500 mL wash volume), in 1 L Erlenmeyer flask
  Washes:
    Acid: 1% muriatic acid (15.9 mL in 500 mL DI water)
    Water: DI water (did 2× water washes so as to be sure as much acid and salts etc removed as possible)
  15 min shaking incubations for each wash, RT in incubator @ 150 rpm
  Centrifuge each flask in 10×50 mL falcon tubes, 5000×g, pour off S/N and either leave to dry, or resuspend pellet in equal volume water and return to flask for wash incubation
  Dried washed samples as pellets in falcon tubes O/N at 55 C in incubator
Key:
  proximate—an assay of the moisture, ash, volatile matter, and fixed carbon as determined by following ASTM D3172.
  ultimate—in the case of coal and coke, the determination of carbon and hydrogen in the material, as found in the gaseous products of its complete combustion, the determination of sulfur, nitrogen, and ash in the material as a whole, and the calculation of oxygen by difference. This data was determined by following ASTM D3176.
  WC=whole cell
  NO CHAR=data was collected on a pre char sample
  Unwash=data was collected prior to any post-charring washing
  post-char wash=data was collected post an acid washing that was performed on the charred material
  Acid.water=sample was washed with acid solution and washed with a water solution prior to charring.
  Acid=sample was washed with acid solution prior to charring.
  Water=sample was washed with a water solution prior to charring.
  Temperature indicates temperature that sample was charred at for designated time
  Biomass Origins/alternative naming structure:
  *Spirulina*: Earthrise Nutraceuticals

TABLE 7

| sample name | Proximate-Volatiles (%) | Proximate-Fixed Carbon (%) | Ulitmate-Carbon (%) | Ulitmate-Hydrogen (%) | Ulitmate-Nitrogen (%) | Ulitmate-Sulfur (%) | Ulitmate-Ash (%) | Ulitmate-Oxygen* (%) |
|---|---|---|---|---|---|---|---|---|
| acid.water-NO CHAR | 84.97 | 12.29 | 58.25 | 6.85 | 13.57 | 1.058 | 2.74 | 17.54 |
| acid.water-200c | 70.79 | 26.05 | 59.5 | 6.42 | 13.52 | 0.535 | 3.16 | 16.87 |
| acid.water-300c | 51.59 | 45.04 | 69.12 | 5.81 | 14.09 | 0.175 | 3.37 | 7.43 |
| acid-200c | 77.5 | 17.57 | 55.24 | 6.53 | 12.81 | 0.903 | 4.93 | 19.6 |
| acid-NO CHAR | 77.14 | 17.43 | 54.79 | 6.4 | 12.55 | 0.996 | 5.43 | 19.85 |
| acid-300c | 52.42 | 38.55 | 64.18 | 5.35 | 13.56 | 0.25 | 9.03 | 7.63 |
| acid.water 500c | 20.27 | 70.04 | 76.09 | 2.27 | 12.68 | 0.055 | 9.69 | 0.01 |
| acid-500c | 32.26 | 47.59 | 67.11 | 2.09 | 11.45 | 0.083 | 20.14 | 0.01 |
| water-200c | 65.43 | 10.15 | 42.06 | 5.22 | 9.2 | 0.458 | 24.41 | 18.66 |
| water-NO CHAR | 62.21 | 10.86 | 44 | 4.86 | 9.98 | 0.746 | 26.93 | 13.48 |
| water-300c | 48.79 | 16.76 | 43.25 | 4.19 | 8.63 | 0.23 | 34.45 | 9.26 |
| water-500c | 26.52 | 18.29 | 30.77 | 1.13 | 5.09 | 0.071 | 55.19 | 7.75 |

TABLE 8

| sample name | Median size (um) | Mean size (um) | Avg. L unwash | Avg. A unwash | Avg. B unwash | Avg. L post-char wash | Avg. A post-char wash | Avg. B post-char wash | yield (%) |
|---|---|---|---|---|---|---|---|---|---|
| acid.water-NO CHAR | 29.95353 | 35.34336 | | | | | | | |
| acid.water-200c | 27.46922 | 32.27657 | 33.84333 | 5.473333 | 12.03667 | | | | 80.1 |
| acid.water-300c | 23.34532 | 34.42562 | 22.1 | .078 | 1.13 | | | | 43.3 |
| acid-200c | 26.41821 | 28.86745 | 43.76333 | 11.00333 | 26.49333 | | | | 86.2 |
| acid-NO CHAR | 26.83751 | 32.02116 | | | | | | | |
| acid-300c | 48.50809 | 55.90345 | 24.5 | 1.61 | 2.44 | | | | 52.8 |
| acid.water 500c | 40.14942 | 48.38518 | 33.03333 | 0.57 | 1.503333 | 31.94667 | 0.09 | 1.233333 | 23 |
| acid-500c | 76.45806 | 92.55213 | 35.97333 | 0.52 | 1.996667 | | | | 25.7 |
| water-200c | 17.98818 | 18.55661 | 64.36667 | 3.556667 | 33.38 | | | | 85.5 |
| water-NO CHAR | 20.8696 | 22.0375 | | | | | | | |
| water-300c | 14.80494 | 15.24186 | 36.19 | 9.863333 | 17.93667 | | | | 62.1 |
| water-500c | 12.8631 | 13.2515 | 25.06333 | 0.88 | 2.173333 | 23.51667 | 0.9 | 2.636667 | 34 |

Example 5

The below data tables (Tables 9 and 10) and Figures highlight the data collected on the species *Spirulina* in several different forms. Experiment Name: ASH TEST.

Biomass washing specifics:
1:25 biomass ratio (20 g LinaX in 500 mL wash volume), in 1 L Erlenmeyer flask Washes:
  Acid: 1% muriatic acid (15.9 mL in 500 mL DI water)
  Water: DI water (did 2× water washes so as to be sure as much acid and salts etc removed as possible)
15 min shaking incubations for each wash. RT in incubator @ 150 rpm
Centrifuge each flask in 10×50 mL falcon tubes, 5000×g, pour off S/N and either leave to dry, or resuspend pellet in equal volume water and return to flask for wash incubation
Dried washed samples as pellets in falcon tubes O/N at 55 C in incubator Key:
  proximate—an assay of the moisture, ash, volatile matter, and fixed carbon as determined by following ASTM D3172.
  ultimate—in the case of coal and coke, the determination of carbon and hydrogen in the material, as found in the gaseous products of its complete combustion, the determination of sulfur, nitrogen, and ash in the material as a whole, and the calculation of oxygen by difference. This data was determined by following ASTM D3176.
  Uncharred/unwashed=material was not pre washed in any form nor was it charred
  Charred/unwashed=material was charred at 500c, but no product washing occurred prior or after the charring process
  Charred/washed=material was charred and then acid washed with a water rinse post the charring process.
  Unwash=data was collected prior to any post-charring washing.
  Temperature indicates temperature that sample was charred at for designated time
  Biomass Origins/alternative naming structure:
    *Spirulina*: Earthrise Nutraceuticals

TABLE 9

| | Proximate-Volatiles (%) | Proximate-Fixed Carbon (%) | Ulitmate-Carbon (%) | Ulitmate-Hydrogen (%) | Ulitmate-Nitrogen (%) | Ulitmate-Sulfur (%) | Ulitmate-Ash (%) |
|---|---|---|---|---|---|---|---|
| Uncharred/unwashed Decolored Spirulina (30% ash) | 58.64 | 8.56 | 37.18 | 4.39 | 8.08 | 0.482 | 32.80 |
| Charred/unwashed Decolored Spirulina (70% ash) | 4.86 | 25.08 | 25.78 | 0.62 | 3.7 | 0.172 | 70.06 |
| Charred/washed (acid-water) Decolored Spirulina (10% ash) | 27.77 | 61.40 | 75.97 | −4.98 | 10.93 | 0.247 | 10.83 |

| | Ulitmate-Oxygen*(%) | Median size (um) | Mean size (um) | Avg. L unwash | Avg. A unwash | Avg. B unwash |
|---|---|---|---|---|---|---|
| Uncharred/unwashed Decolored Spirulina (30% ash) | 17.07 | 67.47977 | 76.79832 | | | |
| Charred/unwashed Decolored Spirulina (70% ash) | <0.01 | 39.8267 | 46.61833 | 21.8433 | 0.36333 | 1.69667 |
| Charred/washed (acid-water) Decolored Spirulina (10% ash) | 7.01 | 15.42425 | 18.66118 | 15.1933 | 0.36333 | 1.47667 |

TABLE 10

Experimental Analysis

| | Decolored Spirulina charred/ unwashed | Decolored Spirulina uncharred/ unwashed | Decolored Spirulina charred/washed (acid/water) |
|---|---|---|---|
| $SiO_2$ | 1.26 | 0.41 | 18.81 |
| $Al_2O_3$ | 1.69 | 1.50 | 3.22 |
| $TiO_2$ | <0.01 | <0.01 | 0.09 |
| $Fe_2O_3$ | 0.32 | 0.20 | 4.07 |
| CaO | 44.00 | 43.30 | 33.50 |
| MgO | 0.46 | 0.45 | 0.65 |
| $Na_2O$ | 8.11 | 6.36 | 2.54 |
| $K_2O$ | 1.80 | 1.71 | 0.77 |
| $P_2O_5$ | 34.16 | 35.94 | 36.38 |
| $SO_3$ | 0.50 | 0.31 | 1.13 |
| Cl | 11.50 | 10.20 | <0.01 |
| $CO_2$ | 0.07 | 0.05 | 0.14 |
| Total | 103.87 | 100.43 | 101.30 |

Example 6

The below data tables (Tables 11 and 12) highlight the data collected on commercial biomass samples that were PRE charred by other entities other than Living Ink prior to any testing or data collection. Experiment Name: COMMERCIAL BIOMASS.

Washing Specifics:
Acid washing—1:25 biomass ratio with 1% muriatic acid (200 g in 5 L 1% acid) performed in 5-gallon buckets. Washing for 20 min. Collected washed char in filter plates. Followed by water wash with 5 L. Collected cakes from filter plates and dried at RT.

Base washing—1:25 biomass ratio with 2% sodium hydroxide (2 g in 50 ml of 2% NaOH solution). Washed for 20 min collected washed char using centrifuge. Followed by water with 50 ml water. Dried the washed char overnight at 55 C.

Key:
proximate—an assay of the moisture, ash, volatile matter, and fixed carbon as determined by following ASTM D3172.
ultimate—in the case of coal and coke, the determination of carbon and hydrogen in the material, as found in the gaseous products of its complete combustion, the determination of sulfur, nitrogen, and ash in the material as a whole, and the calculation of oxygen by difference. This data was determined by following ASTM D3176.
unwashed=material was not washed post-char in any form
Acid/water=char sample was washed post charring with acid solution and washed with a water solution
Base/water=char sample was washed post charring with base solution and washed with a water solution.
Unwash=data was collected prior to any post-charring washing
post-char wash=data was collected post an acid washing that was performed on the charred material
Biomass Origins/alternative naming structure:
Wood Based Biochar: purchased from Wakefield Biochar

TABLE 11

| COMMERCIAL BIOCHAR | Proximate- Volatiles | Proximate- Fixed Carbon | Ulitmate- Carbon | Ulitmate- Hydrogen | Ulitmate- Nitrogen | Ulitmate- Sulfur | Ulitmate- Ash | Ulitmate- Oxygen* |
|---|---|---|---|---|---|---|---|---|
| wood based biochar-unwashed | 22.57 | 64.61 | 74.07 | 0.75 | 0.34 | 0.05 | 12.82 | 11.97 |
| wood based-acid/water | | | | | | | | |
| Coconut char-unwashed | 25 | 72.39 | 79.77 | 2.85 | 0.34 | 0.05 | 25 | 14.38 |
| coconut-acid/water | | | | | | | | |
| coconut-base/water | | | | | | | | |
| Bamboo char-unwashed | 14.54 | 71.92 | 77.65 | 1.63 | 0.79 | 0.11 | 13.54 | 6.28 |
| bamboo char-acid/water | | | | | | | | |
| bamboo char-base/water | | | | | | | | |
| mixed biomass-unwashed | 41.69 | 44.17 | 80.04 | 1.73 | 0.49 | 0.04 | 14.14 | 3.56 |
| mixed biomass-acid/water | | | | | | | | |

Coconut char: purchased from Cool Planet

Bamboo char: purchased from SEEK

Mixed biomass: Purchased from Biochar Now

TABLE 12

| COMMERCIAL BIOCHAR | Median size (um) | Mean size (um) | Avg. L unwash | Avg. A unwash | Avg. B unwash | Avg. L post-char wash | Avg. A post-char wash | Avg. B post-char wash |
|---|---|---|---|---|---|---|---|---|
| wood based biochar-unwashed | | 562.238 | 44.73667 | 0.633333 | 1.383333 | | | |
| wood based-acid/water | 38.06657 | 38.7816 | | | | 16.31 | 0.383333 | 1.383333 |
| Coconut char-unwashed | | 99.77009 | 29.88667 | 0.493333 | 1.533333 | | | |
| coconut-acid/water | | | | | | 27.33667 | 0.253333 | 1.026667 |
| coconut-base/water | | | | | | 26.04 | 0.376667 | 1.25 |
| Bamboo char-unwashed | | 133.5608 | 32.87 | 0.23 | 2.053333 | | | |
| bamboo char-acid/water | | | | | | 29.79333 | 0.126667 | 1.353333 |
| bamboo char-base/water | | | | | | 28.74 | 0.126667 | 1.1 |
| mixed biomass-unwashed | 84.107 | 93.34046 | 31.66333 | 0.09 | 2.03 | | | |
| mixed biomass-acid/water | | | | | | 30.56667 | 0.313333 | 1.886667 |

Although the disclosure has been described with reference to preferred embodiments, persons skilled in the art will recognize that changes may be made in form and detail without departing from the spirit and scope of the disclosed apparatus, systems and methods.

What is claimed is:

1. A method of producing a synthesized carbon black ink from a microbial biomass comprising:
  a. performing thermal processing of the microbial biomass to form a charred biomass;
  b. washing the charred biomass;
  c. grinding the charred biomass, and
  d. mixing the charred biomass into an ink formulation; and
  e. adding a preservative to the ink formulation.

2. The method of claim 1, wherein the microbial biomass is comprised of a plurality of prokaryotic cells.

3. The method of claim 2, wherein the microbial biomass is comprised of decolorized prokaryotic cells.

4. The method of claim 3, wherein the decolorized prokaryotic cells are Arthrospira.

5. The method of claim 2, wherein the average cell size of the prokaryotic cells is below 20 μm.

6. The method of claim 1, further comprising washing the microbial biomass prior to the thermal processing step.

7. The method of claim 6, wherein the wash is an acid wash.

8. The method of claim 6, wherein the microbial biomass is dried until moisture content is reduced to below about 10%.

9. The method of claim 1, wherein the microbial biomass is dried at temperature of from about 30° C. and about 300° C., prior to the thermal processing step.

10. The method of claim 1, wherein thermal processing of the cells is performed by way of a process selected from the group consisting of: pyrolysis, gasification, combustion, thermal-oxidative decomposition, torrefaction, hydrothermal liquefaction, and hydrothermal carbonization.

11. The method of claim 1, wherein the thermal processing step is performed at a temperature range from about 300° C. to about 700° C.

12. The method of claim 1, wherein the thermal processing step is performed for a time interval from about 1 second to about 24 hours.

13. The method of claim 12, wherein the time interval is from about 5 minutes to about 40 minutes.

14. The method of claim 13, wherein the time interval is about 10 minutes.

15. The method of claim 12, wherein the thermal processing step is performed until the concentration of oxygen in the charred biomass is below about 20%.

16. The method of claim 12, wherein the thermal processing step is performed until the concentration of oxygen is from about 10 and 15%.

17. The method of claim 16, wherein the thermal processing step is performed until the concentration of ash in the charred biomass is below about 20%.

18. The method of claim 1, wherein the ink formulation comprises a preservative and wherein the preservative is chosen from the group consisting of monosaccharides, polysaccharides, mono saccharide alcohols, poly saccharide alcohols, glucosylglycerol, glycerol, dextrose, saccharose, trehalose, polyethylene glycol, propylene glycol, glycerine, polyvinylpyrolidone, sorbitol, dextran, methanol, dextrins, dimethyl sulfoxide (DMSO), sodium benzoate, potassium metabisulphate, sodium citrate, sodium chloride, cellulose sulphate, ectoine, Ringer-Locke's solution, gelatin, plasma, amino acid, peptide, or proteins.

* * * * *